(12) United States Patent
Chen et al.

(10) Patent No.: US 12,585,085 B2
(45) Date of Patent: Mar. 24, 2026

(54) OPTICAL CAMERA LENS ASSEMBLY

(71) Applicant: Zhejiang Sunny Optics Co., Ltd,
Yuyao City (CN)

(72) Inventors: Zekun Chen, Yuyao City (CN); Leilei Fu, Yuyao City (CN); Qi Chen, Yuyao City (CN); Fujian Dai, Yuyao City (CN); Liefeng Zhao, Yuyao City (CN)

(73) Assignee: Zhejiang Sunny Optics Co., Ltd,
Yuyao City (CN)

( * ) Notice: Subject to any disclaimer, the term of this patent is extended or adjusted under 35 U.S.C. 154(b) by 360 days.

(21) Appl. No.: 18/297,743

(22) Filed: Apr. 10, 2023

(65) Prior Publication Data

US 2023/0244063 A1 Aug. 3, 2023

(30) Foreign Application Priority Data

Jul. 7, 2022 (CN) .......................... 202210803028.3

(51) Int. Cl.
*G02B 13/00* (2006.01)
*G02B 9/64* (2006.01)
(52) U.S. Cl.
CPC ........... *G02B 9/64* (2013.01); *G02B 13/0045* (2013.01)
(58) Field of Classification Search
CPC .............................. G02B 9/64; G02B 13/0045
See application file for complete search history.

(56) References Cited

FOREIGN PATENT DOCUMENTS

| CN | 109031590 A | * 12/2018 | ............. G02B 13/18 |
| CN | 110412749 A | 11/2019 | |
| CN | 211669434 U | 10/2020 | |
| CN | 218003828 U | 12/2022 | |

OTHER PUBLICATIONS

CN 109031590, translation (Year: 2018).*
Office Action issued Aug. 15, 2025 in Chinese Patent Application No. 202210803028.3.

* cited by examiner

*Primary Examiner* — Wen Huang
(74) *Attorney, Agent, or Firm* — Sughrue Mion, PLLC

(57) ABSTRACT

An optical camera lens assembly comprising seven lenses, where at least one of the first lens to the fourth lens has a negative refractive power; a plurality of spacing elements, comprising a first spacing element disposed on an image-side surface of the first lens and a second spacing element disposed on an image-side surface of the second lens; and a lens barrel, for accommodating the imaging lens group and the plurality of spacing elements; where, radii of curvature of the object-side (R1) and image-side (R2) surfaces of the first lens, and a radius of curvature R3 of an object-side surface of the second lens satisfy: R2/R3>R1/R2>0; and an inner diameter d1s of an object-side surface of the first spacing element, a center thickness CT1 of the first lens, an outer diameter D2m of an image-side surface of the second spacing element, and an air spacing T23 satisfy: 9<d1s/CT1+D2m/T23<26.

12 Claims, 13 Drawing Sheets

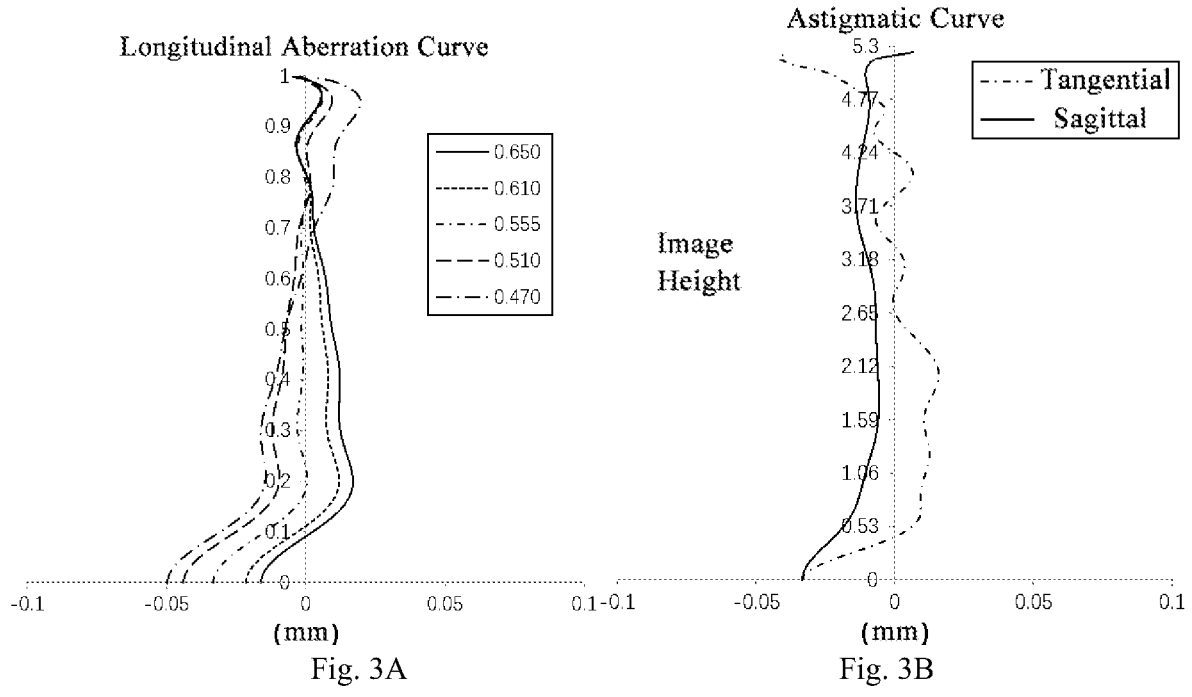
Fig. 3A
Fig. 3B
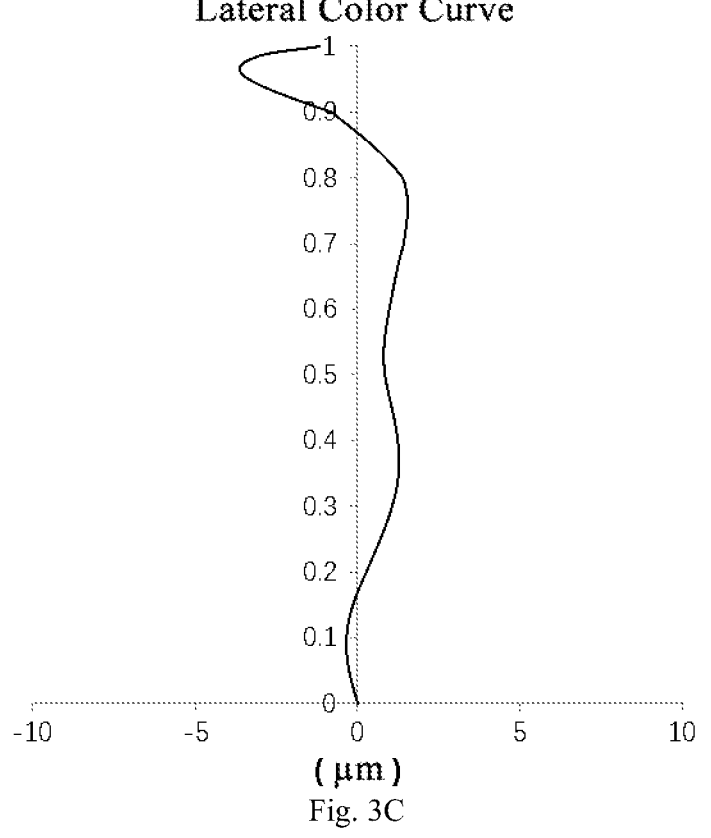
Fig. 3C

OPTICAL CAMERA LENS ASSEMBLY

CROSS-REFERENCE TO RELATED APPLICATIONS

This application claims benefit of priority to Chinese Patent Application No. 202210803028.3 filed on Jul. 7, 2022 before the China National Intellectual Property Administration, the entire disclosure of which is incorporated herein by reference in its entity.

TECHNICAL FIELD

The present disclosure relates to the field of optical elements, in particular, to an optical camera lens assembly.

BACKGROUND

In recent years, with the rapid development of science and technology, the popularity of cell phones is increasing, at the same time, cell phones are also gradually developing towards high performance and high quality. The camera technology of cell phones is one of the important expression of the high performance of cell phones, in the market, a proportion of use of wide-angle lens assemblies having a large field-of-view is also increasing in cell phone cameras. Wide-angle lens assemblies are characterized by a large field-of-view, however, the wide-angle lens assemblies have more angles where stray light appears. Stray light may seriously affect the quality of the lens assemblies, which is also a key difficulty that needs to be overcome in the design of wide-angle lens assemblies and lens assembly optical systems.

SUMMARY

An aspect of the present disclosure provides an optical camera lens assembly, the optical camera lens assembly includes: an imaging lens group, along an optical axis from an object side to an image side sequentially including: a first lens, a second lens, a third lens, a fourth lens, a fifth lens, a sixth lens, and a seventh lens, where at least one of the first lens to the fourth lens has a negative refractive power; a plurality of spacing elements, including a first spacing element disposed on an image-side surface of the first lens and a second spacing element disposed on an image-side surface of the second lens; and a lens barrel, for accommodating the imaging lens group and the plurality of spacing elements; where, a radius of curvature R1 of an object-side surface of the first lens, a radius of curvature R2 of the image-side surface of the first lens, and a radius of curvature R3 of an object-side surface of the second lens satisfy: R2/R3>R1/R2>0; and an inner diameter d1s of an object-side surface of the first spacing element, a center thickness CT1 of the first lens on the optical axis, an outer diameter D2m of an image-side surface of the second spacing element, and an air spacing T23 on the optical axis between the second lens and the third lens satisfy: $9<d1s/CT1+D2m/T23<26$.

In an implementation, an outer diameter D0s of an object-side end surface of the lens barrel facing the object side, the center thickness CT1 of the first lens on the optical axis, an air spacing T12 on the optical axis between the first lens and the second lens, the air spacing T23 on the optical axis between the second lens and the third lens, an outer diameter D0m of an image-side end surface of the lens barrel facing the image side, and an air spacing T67 on the optical axis between the sixth lens and the seventh lens satisfy: $13<D0s/(CT1+T12+T23)+D0m/T67<20$.

In an implementation, the plurality of spacing elements further include a third spacing element disposed on an image-side surface of the third lens, where a spacing distance EP12 between the first spacing element and the second spacing element along the optical axis, a spacing distance EP23 between the second spacing element and the third spacing element along the optical axis, a maximal thickness CP2 of the second spacing element along the optical axis, and an air spacing T34 on the optical axis between the third lens and the fourth lens satisfy: $4<(EP12+CP2+EP23)/T34<6$.

In an implementation, an effective focal length f1 of the first lens, an inner diameter d2s of an object-side surface of the second spacing element, an outer diameter D2m of an image-side surface of the second spacing element, and the air spacing T23 on the optical axis between the second lens and the third lens satisfy: $7<f1/d2s+D2m/T23<25$.

In an implementation, an inner diameter d0s of an object-side end surface of the lens barrel facing the object side, an outer diameter D0s of the object-side end surface of the lens barrel facing the object side, an air spacing T12 on the optical axis between the first lens and the second lens, a center thickness CT2 of the second lens on the optical axis, and a center thickness CT6 of the sixth lens on the optical axis satisfy: $21<d0s/(T12+CT2)+D0s/CT6<27$.

In an implementation, an inner diameter d0m of the image-side end surface of the lens barrel facing the image side, the inner diameter d0s of the object-side end surface of the lens barrel facing the object side, the air spacing T34 on the optical axis between the third lens and the fourth lens, and a center thickness CT4 of the fourth lens on the optical axis satisfy: $12<(d0m-d0s)/(T34+CT4)<21$.

In an implementation, the plurality of spacing elements further include a fourth spacing element disposed on an image-side surface of the fourth lens, where, a radius of curvature R6 of the image-side surface of the third lens, the air spacing T23 on the optical axis between the second lens and the third lens, an outer diameter D4s of an object-side surface of the fourth spacing element, and the center thickness CT4 of the fourth lens on the optical axis satisfy: $28<|R6/T23|+D4s/CT4<62$.

In an implementation, the plurality of spacing elements further include a third spacing element disposed on an image-side surface of the third lens, a fourth spacing element disposed on an image-side surface of the fourth lens, and a fifth spacing element disposed on an image-side surface of the fifth lens, where, a spacing distance EP34 between the third spacing element and the fourth spacing element along the optical axis, an air spacing T34 on the optical axis between the third lens and the fourth lens, a maximal thickness CP5 of the fifth spacing element along the optical axis, and an air spacing T56 between the fifth lens and the sixth lens on the optical axis satisfy: $7<EP34/T34+CP5/T56<10.5$.

In an implementation, the plurality of spacing elements further include a sixth spacing element disposed on an image-side surface of the sixth lens, where, an inner diameter d6m of an image-side surface of the sixth spacing element, an outer diameter D6m of the image-side surface of the sixth spacing element, a radius of curvature R11 of an object-side surface of the sixth lens and a center thickness CT5 of the fifth lens on the optical axis satisfy: $20<d6m/R11+D6m/CT5<30$.

In an implementation, the object-side surface of the first lens is a convex surface, and the image-side surface of the first lens is a concave surface; and the third lens has a positive refractive power, and the image-side surface of the third lens is a convex surface.

In an implementation, the sixth lens has a positive refractive power, the object-side surface of the sixth lens is a convex surface, and the image-side surface of the sixth lens is a concave surface.

In an implementation, the fifth lens has a negative refractive power, and both an object-side surface of the fifth lens and the image-side surface of the fifth lens are concave surfaces.

Another aspect of the present disclosure provide an optical camera lens assembly, the optical camera lens assembly includes: an imaging lens group, along an optical axis from an object side to an image side sequentially including: a first lens, a second lens, a third lens, a fourth lens, a fifth lens, a sixth lens, and a seventh lens, where the third lens has a positive refractive power, and an image-side surface of the third lens is a convex surface; and a combined focal length of the first lens, the second lens and the third lens is a positive refractive power; a plurality of spacing elements, including a second spacing element disposed on an image-side surface of the second lens; and a lens barrel, for accommodating the imaging lens group and the plurality of spacing elements; where, an effective focal length f1 of the first lens, an inner diameter d2s of an object-side surface of the second spacing element, an outer diameter D2m of an image-side surface of the second spacing element, and an air spacing T23 on the optical axis between the second lens and the third lens satisfy: $7 < f1/d2s + D2m/T23 < 25$.

In an implementation, the plurality of spacing elements further include a first spacing element disposed on an image-side surface of the first lens, where, an inner diameter d1s of an object-side surface of the first spacing element, a center thickness CT1 of the first lens on the optical axis, the outer diameter D2m of the image-side surface of the second spacing element, and the air spacing T23 on the optical axis between the second lens and the third lens satisfy: $9 < d1s/CT1 + D2m/T23 < 26$.

In an implementation, an outer diameter D0s of an object-side end surface of the lens barrel facing the object side, a center thickness CT1 of the first lens on the optical axis, an air spacing T12 on the optical axis between the first lens and the second lens, the air spacing T23 on the optical axis between the second lens and the third lens, an outer diameter D0m of an image-side end surface of the lens barrel facing the image side, and an air spacing T67 on the optical axis between the sixth lens and the seventh lens satisfy: $13 < D0s/(CT1 + T12 + T23) + D0m/T67 < 20$.

In an implementation, the plurality of spacing elements further include a first spacing element disposed on an image-side surface of the first lens, and a third spacing element disposed on the image-side surface of the third lens, where, a spacing distance EP12 between the first spacing element and the second spacing element along the optical axis, a spacing distance EP23 between the second spacing element and the third spacing element along the optical axis, a maximal thickness CP2 of the second spacing element along the optical axis, and an air spacing T34 on the optical axis between the third lens and the fourth lens satisfy: $4 < (EP12 + CP2 + EP23)/T34 < 6$.

In an implementation, an inner diameter d0s of an object-side end surface of the lens barrel facing the object side, an outer diameter D0s of the object-side end surface of the lens barrel facing the object side, an air spacing T12 on the optical axis between the first lens and the second lens, a center thickness CT2 of the second lens on the optical axis, and a center thickness CT6 of the sixth lens on the optical axis satisfy: $21 < d0s/(T12 + CT2) + D0s/CT6 < 27$.

In an implementation, an inner diameter d0m of an image-side end surface of the lens barrel facing the image side, an inner diameter d0s of an object-side end surface of the lens barrel facing the object side, an air spacing T34 on the optical axis between the third lens and the fourth lens, and a center thickness CT4 of the fourth lens on the optical axis satisfy: $12 < (d0m - d0s)/(T34 + CT4) < 21$.

In an implementation, the plurality of spacing elements further include a fourth spacing element disposed on an image-side surface of the fourth lens, where, a radius of curvature R6 of the image-side surface of the third lens, the air spacing T23 on the optical axis between the second lens and the third lens, an outer diameter D4s of an object-side surface of the fourth spacing element and a center thickness CT4 of the fourth lens on the optical axis satisfy: $28 < |R6/T23| + D4s/CT4 < 62$.

In an implementation, the plurality of spacing elements further include a third spacing element disposed on the image-side surface of the third lens, a fourth spacing element disposed on an image-side surface of the fourth lens, and a fifth spacing element disposed on an image-side surface of the fifth lens, where, a spacing distance EP34 between the third spacing element and the fourth spacing element along the optical axis, an air spacing T34 on the optical axis between the third lens and the fourth lens, a maximal thickness CP5 of the fifth spacing element along the optical axis, and an air spacing T56 on the optical axis between the fifth lens and the sixth lens satisfy: $7 < EP34/T34 + CP5/T56 < 10.5$.

In an implementation, the plurality of spacing elements further include a sixth spacing element disposed on an image-side surface of the sixth lens, where, an inner diameter d6m of an image-side surface of the sixth spacing element, an outer diameter D6m of the image-side surface of the sixth spacing element, a radius of curvature R11 of an object-side surface of the sixth lens, and a center thickness CT5 of the fifth lens on the optical axis satisfy: $20 < d6m/R11 + D6m/CT5 < 30$.

In an implementation, the sixth lens has a positive refractive power, the object-side surface of the sixth lens is a convex surface, and the image-side surface of the sixth lens is a concave surface.

In an implementation, the fifth lens has a negative refractive power, and both an object-side surface and the image-side surface of the fifth lens are concave surfaces.

The optical camera lens assembly provided in the present disclosure is composed of an imaging lens group, a plurality of spacing elements and a lens barrel, by constraining a curvature shape of the first lens and the second lens, it is conducive to reducing eccentricity sensitivity of the second lens. By reasonably adding spacing elements between adjacent lenses, reasonably designing the inner and outer diameters of the spacers and the spacing distance between the lenses, it can effectively block excess light, improve stray light, standardize and guide chief ray, and improve an imaging quality of the lens assembly. In addition, using the spacing elements to reasonably support and match can also improve molding feasibility and assembly stability of the lens assembly.

BRIEF DESCRIPTION OF THE DRAWINGS

Other features, objectives, and advantages of the present disclosure will become more apparent from the following detailed description of the non-limiting embodiments with reference to the accompanying drawings.

FIGS. 3A-3C respectively illustrate a longitudinal aberration curve, an astigmatic curve, and a lateral color curve of the optical camera lens assembly according to Embodiment 1 of the present disclosure;

DETAILED DESCRIPTION OF EMBODIMENTS

Figure 1:
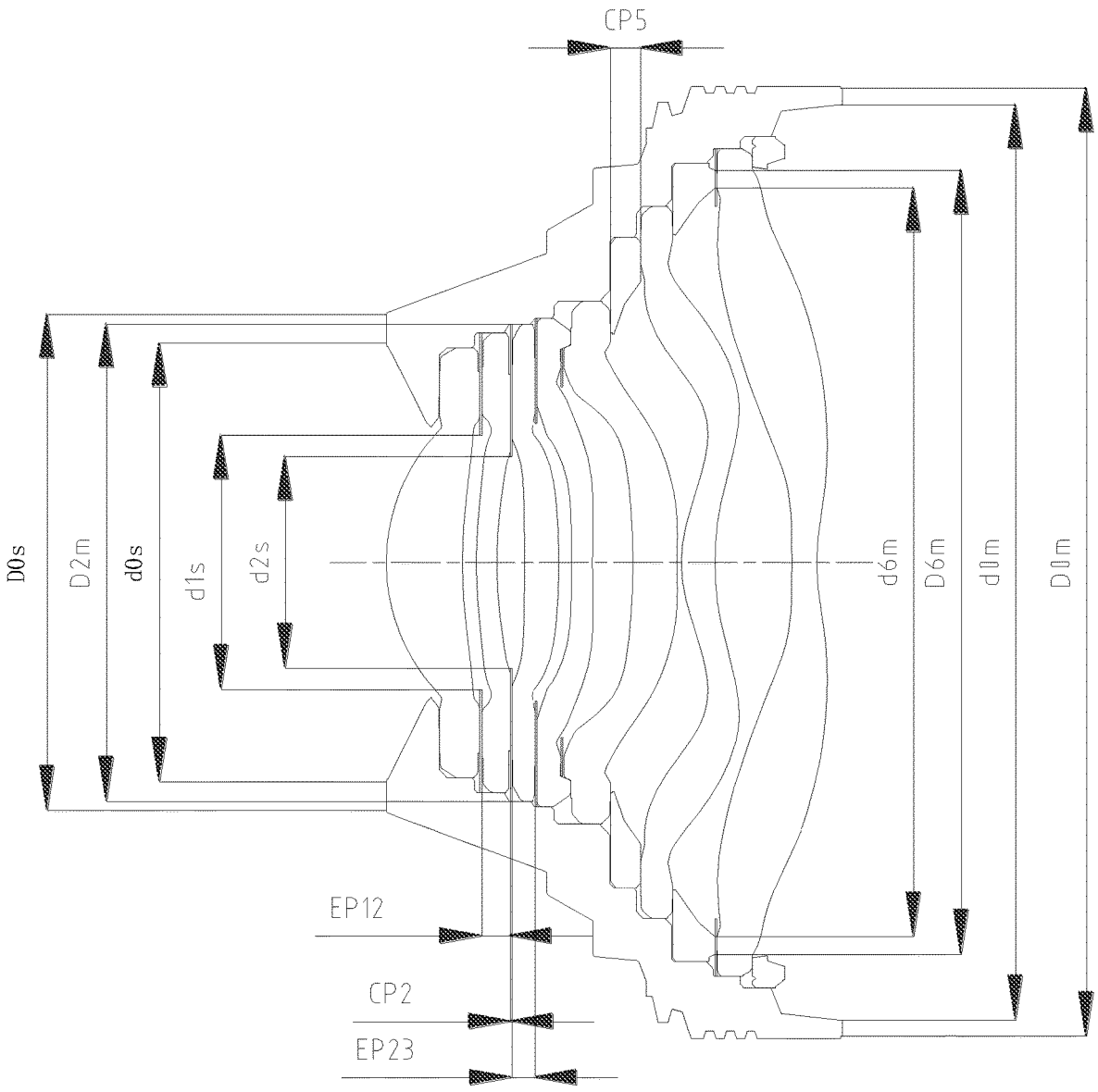
FIG. 1 illustrates a schematic diagram of a structural arrangement diagram and some parameters of an optical camera lens assembly according to embodiments of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least in the paraxial area. In each lens, a surface closest to a photographed object is referred to as the object-side surface of the lens, and a surface closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The following embodiments express only several implementations of the present disclosure, and their descriptions are more specific and detailed, but they are not to be construed as a limitation to the scope of patent of the present disclosure. It should be noted that, for those of ordinary skill in the art, without departing from the concept of the present disclosure, a number of deformations and improvements can be made, which all fall within the scope of protection of the present disclosure. For example, the imaging lens groups (i.e., first lens to seventh lens), lens barrels and spacing elements in embodiments of the present disclosure may be combined with each other in any way, and are not limited to that a lens group in an embodiment can only be combined with a lens barrel, spacing elements, etc. in the same embodiment.

Embodiments of the present disclosure will be described below in detail with reference to the accompanying drawings. FIG. 1 illustrates a schematic diagram of a structural arrangement diagram and some parameters of an optical camera lens assembly according to embodiments of the present disclosure. It should be understood by those skilled in the art that some parameters often used in the art, such as a center thickness CT1 of the first lens on the optical axis, are not shown in FIG. 1, which only exemplarily illustrates some of the parameters of a lens barrel and spacing elements of an optical camera lens assembly of the present disclosure for a better understanding of the present disclosure. As shown in FIG. 1, EP12 indicates a spacing distance between a first spacing element and a second spacing element along the optical axis; EP23 indicates a spacing distance between the second spacing element and a third spacing element along the optical axis; CP2 indicates a maximal thickness of the second spacing element along the optical axis; CP5 indicates a maximal thickness of a fifth spacing element along the optical axis; D0s indicates an outer diameter of an object-side end surface of the lens barrel facing the object side; d0s indicates an inner diameter of the object-side end surface of the lens barrel facing the object side; D0m indicates an outer diameter of an image-side end surface of the lens barrel the facing the image side; d0m indicates an inner diameter of the image-side end surface of the lens barrel facing the image side; d1s indicates an inner diameter of an object-side surface of the first spacing element; d2s indicates an inner diameter of an object-side surface of the second spacing element; D2m indicates an outer diameter of an image-side surface of the second spacing element; d6m indicates an inner diameter of an image-side surface of a sixth spacing element; and D6m indicates an outer diameter of the image-side surface of the sixth spacing element.

Features, principles and other aspects of the present disclosure are described below in detail.

An optical camera lens assembly according to exemplary implementations of the present disclosure includes an imaging lens group and a plurality of spacing elements, where the imaging lens group along an optical axis from an object side to an image side sequentially includes: a first lens, a second lens, a third lens, a fourth lens, a fifth lens, a sixth lens, and a seventh lens. There may be a spacing distance between any two adjacent lenses from the first lens to the seventh lens. By reasonably allocating positive and negative refractive powers and surface types of the lenses of the optical camera lens assembly, low-order aberrations of the optical camera lens assembly may be effectively balanced and controlled, and a tolerance sensitivity can be reduced, miniaturization of the optical camera lens assembly can be maintained.

In an exemplary implementation, at least one of the first lens to the fourth lens has a negative refractive power. Exemplarily, the first lens may have a positive refractive power; the second lens may have a positive or a negative refractive power; the third lens may have a positive refractive power, and the fourth lens may have a negative refractive power; and a combined focal length of the first lens, the second lens and the third lens is a positive refractive power.

In an exemplary implementation, an object-side surface of the first lens is a convex surface, and an image-side surface of the first lens is a concave surface; and an image-side surface of the third lens is a convex surface. This surface type settings effectively reduces eccentricity sensitivity of the second lens.

In an exemplary implementation, the third lens has a positive refractive power, and the image-side surface of the third lens is a convex surface; light converges between the second lens and the third lens, and then gradually diverges, therefore, enabling the converged light to diverge gradually since the image-side surface of the third lens is a convex surface.

In an exemplary implementation, the sixth lens has a positive refractive power, an object-side surface of the sixth lens is a convex surface, and an image-side surface of the sixth lens is a concave surface. A main function of the sixth lens is to adjust light near an outer side, while the seventh lens usually just makes the light emit smoothly. Therefore, the sixth lens may be adjusted, so that light passes through the sixth lens to accomplish a small convergence and then diverges, improving an angle of light divergence. Then, the light passes through the seventh lens again smoothly to accomplish imaging, which is also one of the characteristics of wide-angle lens assemblies, a reasonable layout of internal lenses is required to adjust light multiple times.

In an exemplary implementation, the fifth lens has a negative refractive power, and both an object-side surface and an image-side surface of the fifth lens are concave surfaces. The main function of the fifth lens is to make the converged light smoothly diverge to increase the angle of divergence, therefore, the fifth lens usually has a negative refractive power, and the object-side surface and the image-side surface are both large concave surfaces. After passing through the fourth lens and the fifth lens, light close to a center side gradually diverges at a small angle, and light close to the outer side gradually spreads at a large angle.

In an exemplary implementation, the optical camera lens assembly according to an embodiment of the present disclosure includes at least seven spacing elements, and the spacing elements help the optical camera lens assembly to intercept excess refractive and reflective optical paths, reducing stray light and ghost image.

In an exemplary implementation, as shown in FIGS. 2A-2C, FIGS. 4A-4C, and FIGS. 6A-6C, the plurality of spacing elements include a first spacing element P1 disposed on the image-side surface of the first lens E1, a second spacing element P2 disposed on an image-side surface of the second lens E2, a third spacing element P3 disposed on the image-side surface of the third lens E3, a fourth spacing element P4 disposed on an image-side surface of the fourth lens E4, a fifth spacing element P5 disposed on the image-side surface of the fifth lens E5, a sixth spacing element P6 disposed on the image-side surface of the sixth lens E6, and a seventh spacing element P7 disposed on an image-side surface of the seventh lens E7.

In an exemplary implementation, the plurality of spacing elements further include an auxiliary spacing element disposed between a spacing element and a lens, as shown in FIGS. 2A-2C, FIGS. 4A-4C, and FIGS. 6A-6C, the plurality of spacing elements further include an auxiliary spacing element P6b, the auxiliary spacing element P6b is disposed on an image-side surface of the sixth spacing element P6 and is in contact with an object-side surface of the seventh lens.

In an exemplary implementation, the optical camera lens assembly according to an embodiment of the present disclosure also includes a lens barrel, for accommodating the imaging lens group and the plurality of spacing elements.

In an exemplary implementation, the optical camera lens assembly of an embodiment of the present disclosure may satisfy: R2/R3>R1/R2>0. Here, R1 is a radius of curvature R1 the object-side surface of the first lens, R2 is a radius of curvature of the image-side surface of the first lens, and R3 is a radius of curvature of an object-side surface of the second lens. Satisfying R2/R3>R1/R2>0 constrains a curvature shape of the first lens and the second lens, and is conducive to reducing the eccentricity sensitivity of the second lens. Exemplarily, R2/R3 may be, for example, in a range of 0.9 to 1.2; and R1/R2 may be, for example, in a range of 0.3 to 0.5.

In an exemplary implementation, the optical camera lens assembly of an embodiment of the present disclosure may satisfy: 9<d1s/CT1+D2m/T23<26. Here, d1s is an inner diameter of the object-side surface of the first spacing element, CT1 is a center thickness of the first lens on the optical axis, D2m is the outer diameter of the image-side surface of the second spacing element, and T23 is an air spacing on the optical axis between the second lens and the third lens. More specifically, d1s, CT1, D2m and T23 may further satisfy: 18.0<d1s/CT1+D2m/T23<25.0. Satisfying 9<d1s/CT1+D2m/T23<26 is conducive to guiding the chief ray and improving an imaging quality of the lens assembly. Particularly, the inner diameter of the first spacing element is large, allowing greater amount of admitted light, while receiving incident light and making it subsequently converge, while the second lens and the third lens are where light passes through to accomplish convergence, requiring smooth transition of the light, so that the air spacing between the second lens and the third lens may be set larger compared to an air spacing between the first lens and the second lens. In addition, the spacing elements should be attached to an edge of the chief ray to block stray light. The outer diameter of the second spacing element is large in size, which may avoid light from an edge of the front lens reflecting multiple times in a non-effective lens part between the second spacing element and the second lens, resulting in ghost images or stripe-like stray light.

In an exemplary implementation, the optical camera lens assembly of an embodiment of the present disclosure may satisfy: 13<D0s/(CT1+T12+T23)+D0m/T67<20. Here, D0s is the outer diameter of the object-side end surface of the lens barrel facing the object side, CT1 is the center thickness of the first lens on the optical axis, T12 is an air spacing on the optical axis between the first lens and the second lens, T23 is the air spacing on the optical axis between the second lens and the third lens, D0m is the outer diameter of the image-side end surface of the lens barrel facing the image side, and T67 is an air spacing on the optical axis between the sixth lens and the seventh lens. More specifically, D0s, CT1, T12, T23, D0m, and T67 may further satisfy: $15 < D0s/(CT1+T12+T23)+D0m/T67 < 19$. Satisfying $13 < D0s/(CT1+T12+T23)+D0m/T67 < 20$ is conducive to the rationalization and processability of an overall structure of the lens barrel while matching the design of the optical system. The outer diameter of the object-side end surface of the lens barrel and the outer diameter of the image-side end surface of the lens barrel take into account structural rationality and assembly stability on basis of meeting the optical system (no interfering with exiting and incident light). The sixth lens and the seventh lens are divergent and emitting positions of light, the key point of imaging, requiring smooth passage of central light, therefore, the air spacing between the sixth lens and the seventh lens is usually larger than those in the front part of the optical system.

In an exemplary implementation, the optical camera lens assembly of an embodiment of the present disclosure may satisfy: $4 < (EP12+CP2+EP23)/T34 < 6$. Here, EP12 is a spacing distance between the first spacing element and the second spacing element along the optical axis, EP23 is a spacing distance between the second spacing element and the third spacing element along the optical axis, CP2 is a maximal thickness of the second spacing element along the optical axis, and T34 is an air spacing on the optical axis between the third lens and the fourth lens. More specifically, EP12, CP2, EP23, and T34 may further satisfy: $4.2 < (EP12+CP2+EP23)/T34 < 5.5$. The second spacing element is where light convergence is completed, and the thickness of the spacing element has an important impact on the effect of light convergence. Satisfying $4 < (EP12+CP2+EP23)/T34 < 6$, reasonable control of the spacing distance between the first spacing element and the second spacing element, and the spacing distance between the third spacing element and the second spacing element may affect an overall light convergence and divergence process. After the third lens, the light is gradually divergent, so the third lens, the fourth lens are convex to the image side, and the air spacing may be smaller.

In an exemplary implementation, the optical camera lens assembly of an embodiment of the present disclosure may satisfy: $7 < f1/d2s+D2m/T23 < 25$. Here, f1 is an effective focal length of the first lens, d2s is the inner diameter of the object-side surface of the second spacing element, D2m is the outer diameter of the image-side surface of the 5 second spacing element, and T23 is the air spacing on the optical axis between the second lens and the third lens. More specifically, f1, d2s, D2m and T23 may further satisfy: $17.5 < f1/d2s+D2m/T23 < 24.0$. Satisfying $7 < f1/d2s+D2m/T23 < 25$ may ensure smooth and effective convergence of incident light between the second lens and the third lens, and the spacing element is immediately close to the edge of the light and close to an effective diameter of the lens, which may effectively block stray light and improve the imaging quality.

In an exemplary implementation, the optical camera lens assembly of an embodiment of the present disclosure may satisfy: $21 < d0s/(T12+CT2)+D0s/CT6 < 27$. Here, d0s is the inner diameter of the object-side end surface of the lens barrel facing the object side, D0s is the outer diameter of the object-side end surface of the lens barrel facing the object side, T12 is the air spacing on the optical axis between the first lens and the second lens, CT2 is a center thickness of the second lens on the optical axis, and CT6 is a center thickness of the sixth lens on the optical axis. More specifically, d0s, T12, CT2, D0s, and CT6 may further satisfy:

$21.4 < d0s/(T12+CT2)+D0s/CT6 < 26.1$. The inner diameter of the object-side end surface of the lens barrel facing the object side needs to be at a certain distance from the outermost incident light. Satisfying $21 < d0s/(T12+CT2)+D0s/CT6 < 27$ may ensure that the lens barrel can control the size of the object-side end surface to the greatest extent, under the condition of accommodating exiting and incident light from the optical camera lens assembly, so that the optical camera lens assembly can not only ensure the assembly stability, but also maintain a compact shape, to meet the demand of major manufacturers for equipment size.

In an exemplary implementation, the optical camera lens assembly of an embodiment of the present disclosure may satisfy: $12 < (d0m-d0s)/(T34+CT4) < 21$. Here, d0m is the inner diameter of the image-side end surface of the lens barrel facing the image side, d0s is the inner diameter of the object-side end surface of the lens barrel facing the object side, T34 is the air spacing on the optical axis between the third lens and the fourth lens, and CT4 is a center thickness of the fourth lens on the optical axis. More specifically, d0m, d0s, T34, and CT4 may further satisfy: $13.0 < (d0m-d0s)/(T34+CT4) < 20.0$. The inner diameter of the object-side end surface of the lens barrel facing the object side, and the inner diameter of the image-side end surface of the lens barrel facing the image side, need to consider the outermost dimension of the exiting and incident light of the optical camera lens assembly. The third lens and the fourth lens are where light begins to diverge gradually after light convergence is completed. Satisfying $12 < (d0m-d0s)/(T34+CT4) < 21$ may reasonably control the size of the front and rear inner diameters of the lens barrel as well as rationality of the overall lens assembly for light guidance, improve lens assembly molding, and the assembly stability.

In an exemplary implementation, the optical camera lens assembly of the present disclosure may satisfy: $28 < |R6/T23|+D4s/CT4 < 62$. Here, R6 is a radius of curvature of the image-side surface of the third lens, T23 is the air spacing on the optical axis between the second lens and the third lens, D4s is an outer diameter of an object-side surface of the fourth spacing element, and CT4 is the center thickness of the fourth lens on the optical axis. More specifically, R6, T23, D4s, and CT4 may further satisfy: $41.0 < |R6/T23|D+4s/CT4 < 60.5$. Satisfying $28 < |R6/T23|D+4s/CT4 < 62$ is conducive to effectively controlling the effective diameters of the third and fourth lenses, thereby affecting an angle of light divergence after convergence. The radius of curvature of the image-side surface of the third lens is large, and the air spacing between the second lens and the third lens is large. Reasonably setting the support outer diameter of the fourth spacing element may allow light to diverge effectively after a smooth convergence, improve the imaging quality, at the same time ensure a reasonable stability of adjacent structures.

In an exemplary implementation, the optical camera lens assembly of an embodiment of the present disclosure may satisfy: $7 < EP34/T34+CP5/T56 < 10.5$. Here, EP34 is a spacing distance between the third spacing element and the fourth spacing element along the optical axis, T34 is the air spacing between the third lens and the fourth lens on the optical axis, CP5 is a maximal thickness of the fifth spacing element along the optical axis, and T56 is an air spacing between the fifth lens and the sixth lens on the optical axis. More specifically, EP34, T34, CP5, and T56 may further satisfy: $7.2 < EP34/T34+CP5/T56 < 10.0$. The distance between the third spacing element and the fourth spacing element may affect an edge thickness of the fourth lens, the fourth lens is the key to excessive light divergence, and the fifth spacing element may affect an air spacing at the edge of the fifth lens and the effective diameter of the sixth lens. Satisfying $7 < EP34/T34+CP5/T56 < 10.5$ can make the light near the optical axis pass smoothly, and light at the edge gradually diverges and expands the angle, improving the image quality.

In an exemplary implementation, the optical camera lens assembly of the present disclosure may satisfy: $20<d6m/R11+D6m/CT5<30$. Here, d6m is the inner diameter of the image-side surface of the sixth spacing element, D6m is the outer diameter of the image-side surface of the sixth spacing element, R11 is a radius of curvature of the object-side surface of the sixth lens, and CT5 is a center thickness of the fifth lens on the optical axis. More specifically, d6m, R11, D6m, and CT5 may further satisfy: $22.4<d6m/R11+D6m/CT5<29.0$. The fifth lens and the sixth lens provides a transition interval for the increase of light divergence angle. The inner diameter and the outer diameter of the image-side surface of the sixth spacing element and the seventh lens support each other, which may affect a length of a non-mechanical part of the seventh lens. The seventh lens is a lens having the maximal outer diameter. Reasonable setting may ensure the thickness of the lens barrel, and the assembly is more stable. Therefore, satisfying $20<d6m/R11+D6m/CT5<30$ may ensure effective spreading of the light, ensure the imaging quality, at the same time can ensure that the lens structure is reasonable, the overall size is reduced, and the demand of equipment manufacturers for compactness of the lens assembly is met.

In an exemplary implementation, an effective focal length f of the optical camera lens assembly may be, for example, in a range of 4.8 mm to 5.3 mm, the effective focal length f1 of the first lens may be, for example, in a range of 6.1 mm to 6.5 mm, an effective focal length f2 of the second lens may be, for example, in a range of –37.5 mm to 500 mm, an effective focal length f3 of the third lens may be, for example, in a range of 16.5 mm to 30.5 mm, an effective focal length f4 of the fourth lens may be, for example, in a range of –35.0 mm to –19.0 mm, an effective focal length f5 of the fifth lens may be, for example, in a range of –7.8 mm to –7.0 mm, an effective focal length f6 of the sixth lens may be, for example, in a range of 3.5 mm to 3.7 mm, and an effective focal length f7 of the seventh lens may be, for example, in a range of –4.4 mm to –4.2 mm. Half of a maximal field-of-view Semi-FOV of the optical camera lens assembly may be, for example, in a range of 44.2° to 44.3°. An F-number Fno of the optical camera lens assembly may be, for example, in a range of 1.65 to 1.67. Exemplarily, the optical camera lens assembly has an F-number Fno of 1.66.

In implementations of the present disclosure, at least one of the surfaces of the lenses is an aspheric surface. That is, at least one of the surfaces from the object-side surface of the first lens to the image-side surface of the seventh lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and improving the astigmatic aberration. The use of the aspheric lens can eliminate as much as possible the aberrations that occur during the imaging, thereby improving the imaging quality. Alternatively, the object-side surface and the image-side surface of each of the first lens to the seventh lens are aspheric surfaces.

In an exemplary implementation, the above optical camera lens assembly may further include an optical filter for correcting color deviations and/or a protective glass for protecting a photosensitive element on the image plane.

The optical camera lens assembly according to the above implementations of the present disclosure may use a plurality of lenses, for example, the above seven lenses. By reasonably distributing the refractive powers, the surface types of the lenses and the arrangement of the spacing elements, etc., it may effectively intercept excess light from an external field-of-view, improve the imaging quality, reduce the total track length of the optical camera lens assembly, realize miniaturization of the module, and make the optical camera lens assembly more conducive to production processing.

However, it should be understood by those skilled in the art that the various results and advantages described in implementations of the present specification may be obtained by changing the number of the lenses constituting the optical camera lens assembly without departing from the technical solution claimed by the present disclosure. For example, although the optical camera lens assembly having seven lenses is described as an example in the implementations, the optical camera lens assembly is not limited to including the seven lenses. If desired, the optical camera lens assembly may also include other numbers of lenses.

Specific embodiments of the optical camera lens assembly that may be applicable to the above implementations are further described below with reference to the accompanying drawings.

Embodiment 1

Figure 2A:
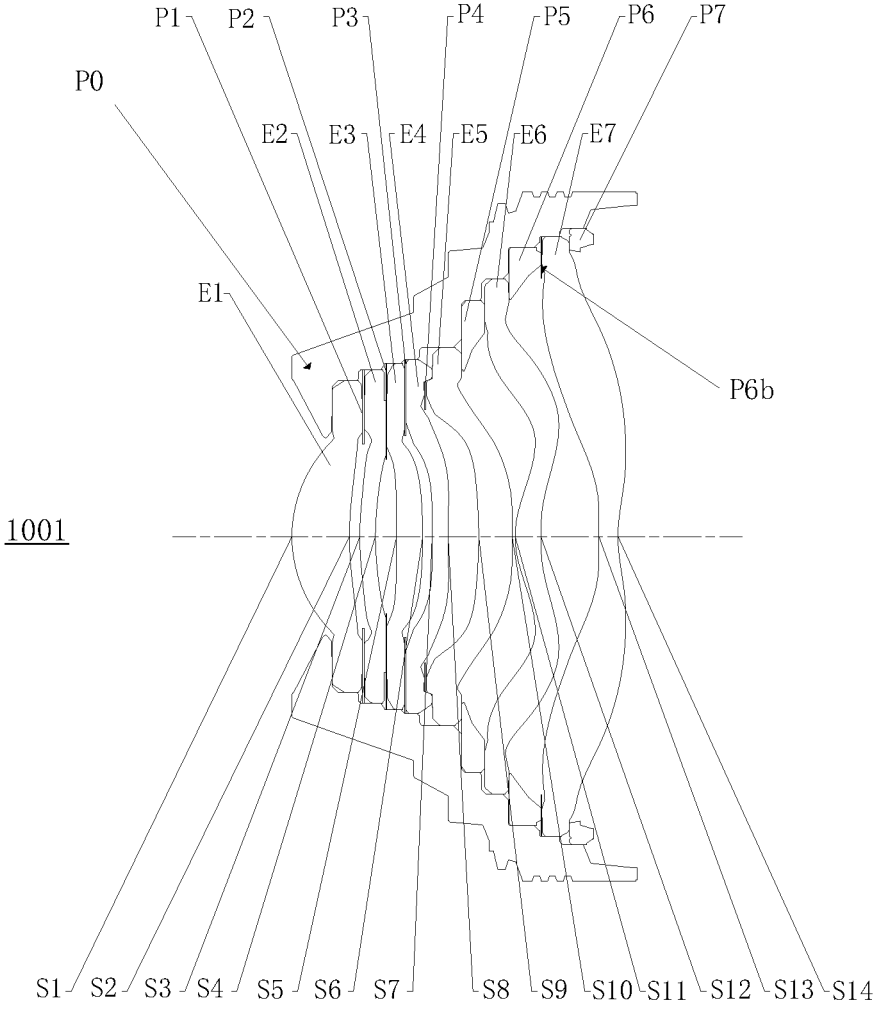
FIGS. 2A-2C illustrate schematic structural diagrams of an optical camera lens assembly according to Embodiment 1 of the present disclosure.
Figure 2B:
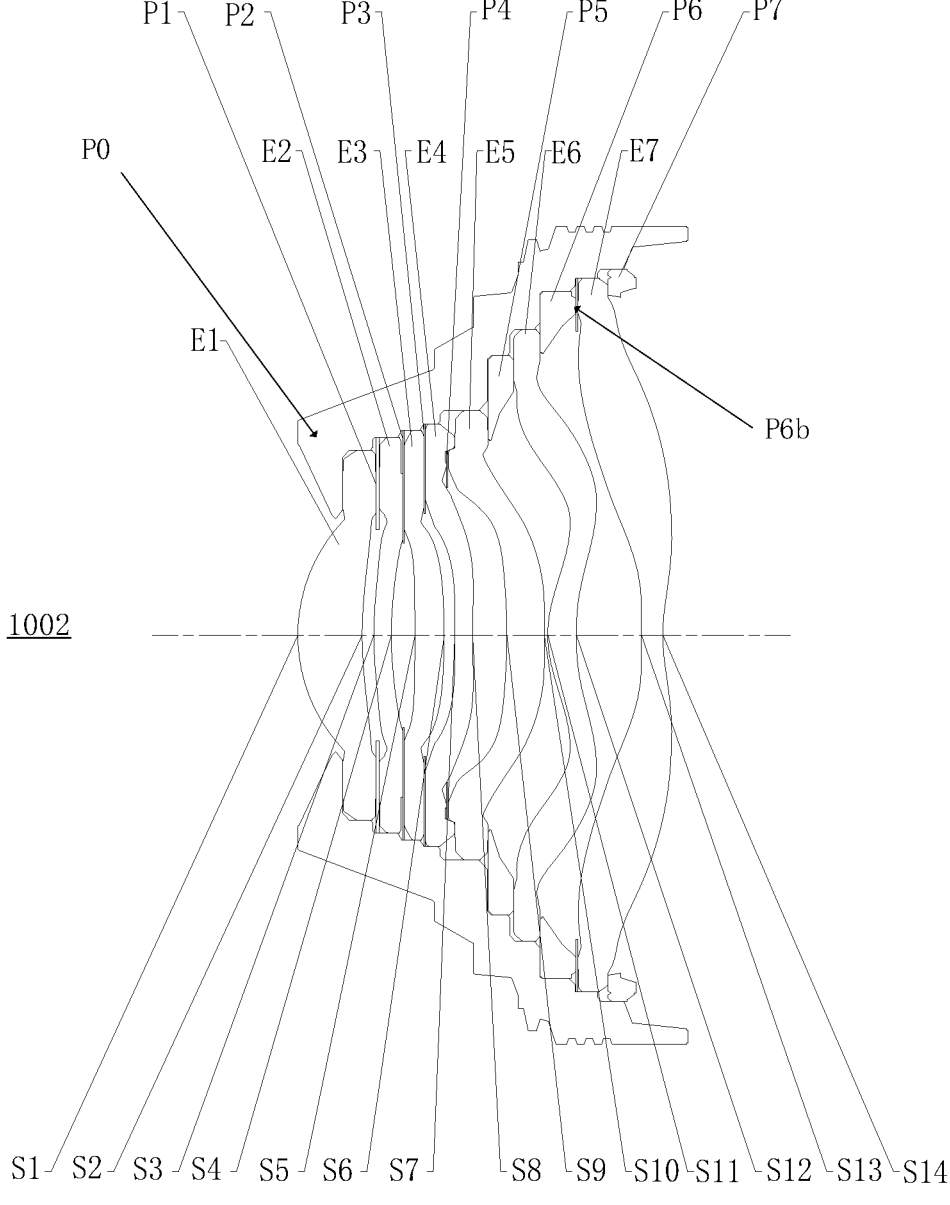
Figure 2C:
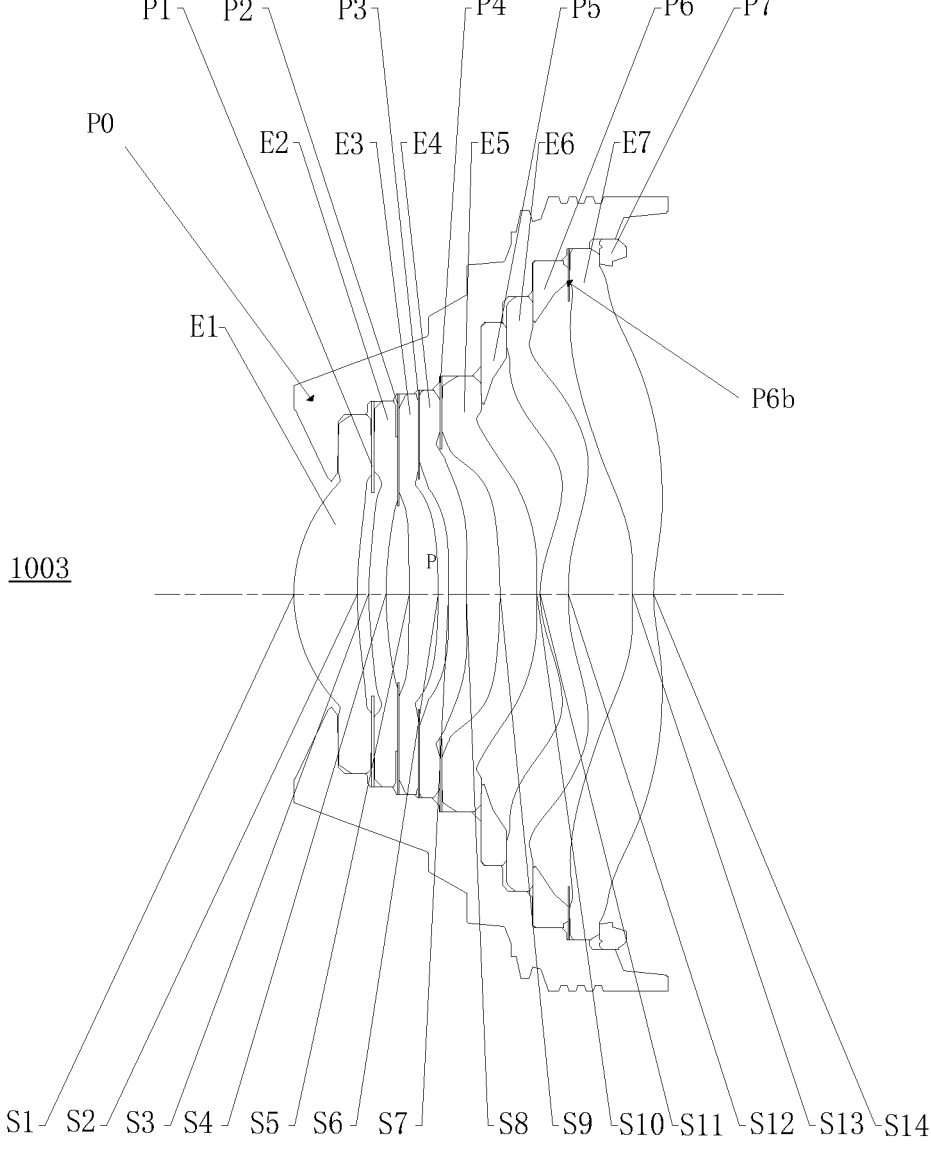

An optical camera lens assembly 1001, an optical camera lens assembly 1002, and an optical camera lens assembly 1003 according to Embodiment 1 of the present disclosure is described below with reference to FIGS. 2A-3C. FIGS. 2A-2C respectively illustrate schematic structural diagrams of the optical camera lens assembly 1001, the optical camera lens assembly 1002, and the optical camera lens assembly 1003 according to Embodiment 1 of the present disclosure.

As shown in FIGS. 2A-2C, the optical camera lens assembly 1001, the optical camera lens assembly 1002 and the optical camera lens assembly 1003 each include a lens barrel P0, an imaging lens group including lenses E1 to E7, and a plurality of spacing elements P1 to P7, respectively.

As shown in FIGS. 2A-2C, the optical camera lens assembly 1001, the optical camera lens assembly 1002, and the optical camera lens assembly 1003 use the same imaging lens group, and the imaging lens group from an object side to an image side sequentially includes: a first lens E1, a second lens E2, a third lens E3, a fourth lens E4, a fifth lens E5, a sixth lens E6, and a seventh lens E7 respectively. The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a concave surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. Light from an object sequentially passes through the surfaces S1-S14 and finally forms an image on the image plane (not shown).

Table 1 shows a table of basic parameters of the imaging lens group of the optical camera lens assembly 1001, the optical camera lens assembly 1002 and the optical camera lens assembly 1003 in Embodiment 1. Here, the units of a radius of curvature, a thickness and an effective focal length are millimeters (mm).

TABLE 1

| surface number | surface type | radius of curvature | thickness | material refractive index | abbe number | effective focal length | conic coefficient |
|---|---|---|---|---|---|---|---|
| OBJ | spherical | infinite | infinite | | | | |
| STO | spherical | infinite | −0.5459 | | | | |
| S1 | aspheric | 2.0705 | 0.9209 | 1.50 | 81.56 | 6.42 | 0.0173 |
| S2 | aspheric | 5.0069 | 0.1668 | | | | −1.5020 |
| S3 | aspheric | 4.5613 | 0.2500 | 1.67 | 19.25 | 499.05 | −1.1016 |
| S4 | aspheric | 4.5213 | 0.3387 | | | | 0.6720 |
| S5 | aspheric | −37.1500 | 0.4203 | 1.54 | 56.05 | 17.53 | 0.0000 |
| S6 | aspheric | −7.6368 | 0.1505 | | | | 0.0000 |
| S7 | aspheric | 144.4089 | 0.2551 | 1.67 | 19.25 | −19.26 | 0.0000 |
| S8 | aspheric | 11.9604 | 0.4924 | | | | 0.0000 |
| S9 | aspheric | −6.2649 | 0.5335 | 1.57 | 37.31 | −7.24 | 1.9586 |
| S10 | aspheric | 12.4110 | 0.0497 | | | | 0.0000 |
| S11 | aspheric | 1.4287 | 0.4108 | 1.54 | 56.05 | 3.51 | −1.0000 |
| S12 | aspheric | 5.0716 | 0.9314 | | | | −85.0747 |
| S13 | aspheric | 171.8044 | 0.3053 | 1.54 | 55.65 | −4.29 | 0.0000 |
| S14 | aspheric | 2.2700 | 0.3375 | | | | −1.0000 |
| S15 | spherical | infinite | 0.2100 | 1.52 | 64.20 | | |
| S16 | spherical | infinite | 0.3154 | | | | |
| S17 | spherical | infinite | | | | | |

In this example, an effective focal length f of each of the optical camera lens assembly 1001, the optical camera lens assembly 1002, and the optical camera lens assembly 1003 is 4.9 mm, half of a maximal field-of-view semi-FOV of each of the optical camera lens assembly 1001, the optical camera lens assembly 1002 and the optical camera lens assembly 1003 is 44.3°, and an F-number Fno of each of the optical camera lens assembly 1001, the optical camera lens assembly 1002 and the optical camera lens assembly 1003 is 1.66.

In Embodiment 1, both the object-side surfaces and the image-side surfaces of the first to seventh lenses E1 to E7 are aspheric surfaces, and the surface type x of an aspheric lens may be defined using, but not limited to, the following formula:

$$x = \frac{ch^2}{1 + \sqrt{1 - (k+1)c^2h^2}} + \sum A_i h^i. \tag{1}$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Table 2-1 and table 2-2 below show the high-order coefficients $A_4$, $A_6$, $A_8$, $A_{10}$, Au, $A_{14}$, $A_{16}$, $A_{18}$, $A_{20}$, $A_{22}$, $A_{24}$, $A_{26}$, $A_{28}$ and $A_{30}$ applicable to the aspheric surfaces S1 to S14 in Embodiment 1.

TABLE 2-1

| surface name | A4 | A6 | A8 | A10 | A12 | A14 | A16 |
|---|---|---|---|---|---|---|---|
| S1 | −5.3930E−03 | 4.4167E−02 | −2.1708E−01 | 6.7749E−01 | −1.4210E+00 | 2.0788E+00 | −2.1725E+00 |
| S2 | −1.1051E−02 | −7.4462E−02 | 4.7618E−01 | −1.9349E+00 | 5.2248E+00 | −9.7771E+00 | 1.3020E+01 |
| S3 | −4.0259E−02 | 6.2282E−02 | −4.9461E−01 | 2.1560E+00 | −6.0843E+00 | 1.1896E+01 | −1.6571E+01 |
| S4 | −7.2174E−03 | −2.0079E−01 | 1.7590E+00 | −9.6417E+00 | 3.4753E+01 | −8.5989E+01 | 1.5039E+02 |
| S5 | −6.1587E−04 | 4.7140E−02 | −5.2817E−01 | 2.5637E+00 | −8.0134E+00 | 1.7143E+01 | −2.5942E+01 |
| S6 | 3.8812E−02 | −3.8147E−01 | 1.9559E+00 | −7.0434E+00 | 1.7779E+01 | −3.2036E+01 | 4.1756E+01 |
| S7 | −3.5888E−02 | −2.3225E−01 | 1.0763E+00 | −4.0570E+00 | 1.1566E+01 | −2.3923E+01 | 3.5703E+01 |
| S8 | −4.2252E−02 | −4.3090E−02 | 1.4177E−02 | 1.4315E−01 | −3.6517E−01 | 4.8227E−01 | −4.1016E−01 |
| S9 | 5.6645E−02 | −5.8714E−02 | −2.9364E−02 | 2.0104E−01 | −3.6229E−01 | 3.8388E−01 | −2.6854E−01 |
| S10 | −2.2978E−01 | 7.1742E−02 | 2.3135E−01 | −5.0202E−01 | 5.6822E−01 | −4.3289E−01 | 2.3564E−01 |
| S11 | −1.4051E−01 | 4.6567E−02 | −3.4060E−02 | 3.0779E−02 | −2.0212E−02 | 8.5712E−03 | −2.4158E−03 |
| S12 | 2.9025E−01 | −3.8895E−01 | 3.0329E−01 | −1.6134E−01 | 6.0732E−02 | −1.6558E−02 | 3.3130E−03 |
| S13 | −1.3129E−01 | 2.1576E−02 | 2.0121E−02 | −1.2441E−02 | 3.4396E−03 | −5.7220E−04 | 6.1214E−05 |
| S14 | −1.4937E−01 | 5.5117E−02 | −1.4426E−02 | 3.5339E−03 | −9.7391E−04 | 2.4088E−04 | −4.3913E−05 |

TABLE 2-2

| surface name | A18 | A20 | A22 | A24 | A26 | A28 | A30 |
|---|---|---|---|---|---|---|---|
| S1 | 1.6435E+00 | −9.0308E−01 | 3.5756E−01 | −9.9620E−02 | 1.8576E−02 | −2.0856E−03 | 1.0677E−04 |
| S2 | −1.2504E+01 | 8.6786E+00 | −4.3086E+00 | 1.4905E+00 | −3.4091E−01 | 4.6283E−02 | −2.8208E−03 |
| S3 | 1.6673E+01 | −1.2142E+01 | 6.3339E+00 | −2.3049E+00 | 5.5508E−01 | −7.9426E−02 | 5.1070E−03 |
| S4 | −1.8878E+02 | 1.7067E+02 | −1.1013E+02 | 4.9458E+01 | −1.4682E+01 | 2.5893E+00 | −2.0536E−01 |
| S5 | 2.8188E+01 | −2.2033E+01 | 1.2251E+01 | −4.7141E+00 | 1.1892E+00 | −1.7623E−01 | 1.1581E−02 |
| S6 | −3.9660E+01 | 2.7424E+01 | −1.3645E+01 | 4.7554E+00 | −1.1009E+00 | 1.5197E−01 | −9.4576E−03 |
| S7 | −3.8541E+01 | 3.0049E+01 | −1.6735E+01 | 6.4867E+00 | −1.6616E+00 | 2.5278E−01 | −1.7291E−02 |
| S8 | 2.3800E−01 | −9.5404E−02 | 2.6063E−02 | −4.6440E−03 | 4.8752E−04 | −2.2897E−05 | 0.0000E+00 |
| S9 | 1.2711E−01 | −3.9917E−02 | 7.6386E−03 | −6.2527E−04 | −5.7164E−05 | 1.7249E−05 | −1.1263E−06 |
| S10 | −9.3277E−02 | 2.6844E−02 | −5.5413E−03 | 7.9712E−04 | −7.5706E−05 | 4.2599E−06 | −1.0744E−07 |
| S11 | 4.6938E−04 | −6.4135E−05 | 6.1717E−06 | −4.1043E−07 | 1.7982E−08 | −4.6746E−10 | 5.4653E−12 |
| S12 | −4.8863E−04 | 5.2906E−05 | −4.1472E−06 | 2.2877E−07 | −8.4178E−09 | 1.8542E−10 | −1.8495E−12 |
| S13 | −4.1436E−06 | 1.5138E−07 | 7.3178E−11 | −3.0136E−10 | 1.4849E−11 | −3.3046E−13 | 2.9729E−15 |
| S14 | 5.6205E−06 | −5.0323E−07 | 3.1386E−08 | −1.3373E−09 | 3.7138E−11 | −6.0613E−13 | 4.4122E−15 |

As shown in FIGS. 2A-2C, the optical camera lens assembly 1001, the optical camera lens assembly 1002, and the optical camera lens assembly 1003 each include eight spacing elements, which are a first spacing element P1, a second spacing element P2, a third spacing element P3, a fourth spacing element P4, a fifth spacing element P5, a sixth spacing element P6, an auxiliary spacing element P6b, and a seventh spacing element P7. Here, the first spacing element P1 is disposed on the image-side surface of the first lens E1; the second spacing element P2 is disposed on the image-side surface of the second lens E2; the third spacing element P3 is disposed on the image-side surface of the third lens E3; the fourth spacing element P4 is disposed on the image-side surface of the fourth lens E4; the fifth spacing element P5 is disposed on the image-side surface of the fifth lens E5; the sixth spacing element P6 is disposed on the image-side surface of the sixth lens E6; the auxiliary spacing element P6b is disposed on the image-side surface of the sixth lens E6 and is in contact with the object-side surface of the seventh lens E7; and the seventh spacing element P7 is disposed on the image-side surface of the seventh lens E7.

In this embodiment, the first spacing element P1, the second spacing elements P2, the third spacing element P3, the fourth spacing element P4, and the auxiliary spacing element P6b of the optical camera lens assembly 1001, the optical camera lens assembly 1002 and the optical camera lens assembly 1003 are spacer sheets, the fifth spacing element P5 and the sixth spacing element P6 are spacer rings, and the seventh spacing element P7 is a compression ring. The above spacing elements may block the entry of excess external light, so that the lenses can be better supported by the lens barrel, enhancing the structural stability of the optical camera lens assembly 1001, the optical camera lens assembly 1002 and the optical camera lens assembly 1003.

Table 3 shows basic parameters of the spacing elements and the lens barrel of the optical camera lens assembly 1001, the optical camera lens assembly 1002 and the optical camera lens assembly 1003 in Embodiment 1. The optical camera lens assembly 1001, the optical camera lens assembly 1002 and the optical camera lens assembly 1003 differ in structural dimensions of the spacing elements.

TABLE 3

| embodiment parameter | optical camera lens assembly 1001 | optical camera lens assembly 1002 | optical camera lens assembly 1003 |
|---|---|---|---|
| d1s | 2.900 | 2.800 | 2.778 |
| d2s | 2.418 | 2.444 | 2.409 |

TABLE 3-continued

| embodiment parameter | optical camera lens assembly 1001 | optical camera lens assembly 1002 | optical camera lens assembly 1003 |
|---|---|---|---|
| D2m | 5.442 | 5.430 | 5.464 |
| d6m | 8.534 | 8.558 | 8.558 |
| D6m | 8.937 | 8.872 | 8.872 |
| d0s | 5.003 | 5.103 | 5.085 |
| d0m | 10.430 | 10.470 | 10.443 |
| D0s | 5.654 | 5.654 | 5.694 |
| D0m | 10.804 | 10.804 | 10.845 |
| EP12 | 0.344 | 0.344 | 0.346 |
| CP2 | 0.018 | 0.018 | 0.016 |
| EP23 | 0.287 | 0.285 | 0.287 |
| CP5 | 0.365 | 0.365 | 0.370 |
| D4s | 4.874 | 4.874 | 5.95 |
| EP34 | 0.298 | 0.298 | 0.298 |

FIG. 3A illustrates a longitudinal aberration curve of the optical camera lens assembly 1001, the optical camera lens assembly 1002 and the optical camera lens assembly 1003 according to Embodiment 1, representing deviations of focal points of light of different wavelengths converged after passing through the lens assembly. FIG. 3B illustrates an astigmatic curve of the optical camera lens assembly 1001, the optical camera lens assembly 1002 and the optical camera lens assembly 1003 according to Embodiment 1, representing a curvature of a tangential image plane and a curvature of a sagittal image plane. FIG. 3C illustrates a lateral color curve of the optical camera lens assembly 1001, the optical camera lens assembly 1002 and the optical camera lens assembly 1003 in Embodiment 1, representing deviations of different image heights on the image plane formed by light passing through the lens assembly. It can be seen from FIGS. 3A-3C that the optical camera lens assembly 1001, the optical camera lens assembly 1002 and the optical camera lens assembly 1003 given in Embodiment 1 can achieve a good imaging quality.

Embodiment 2

Figure 4A:
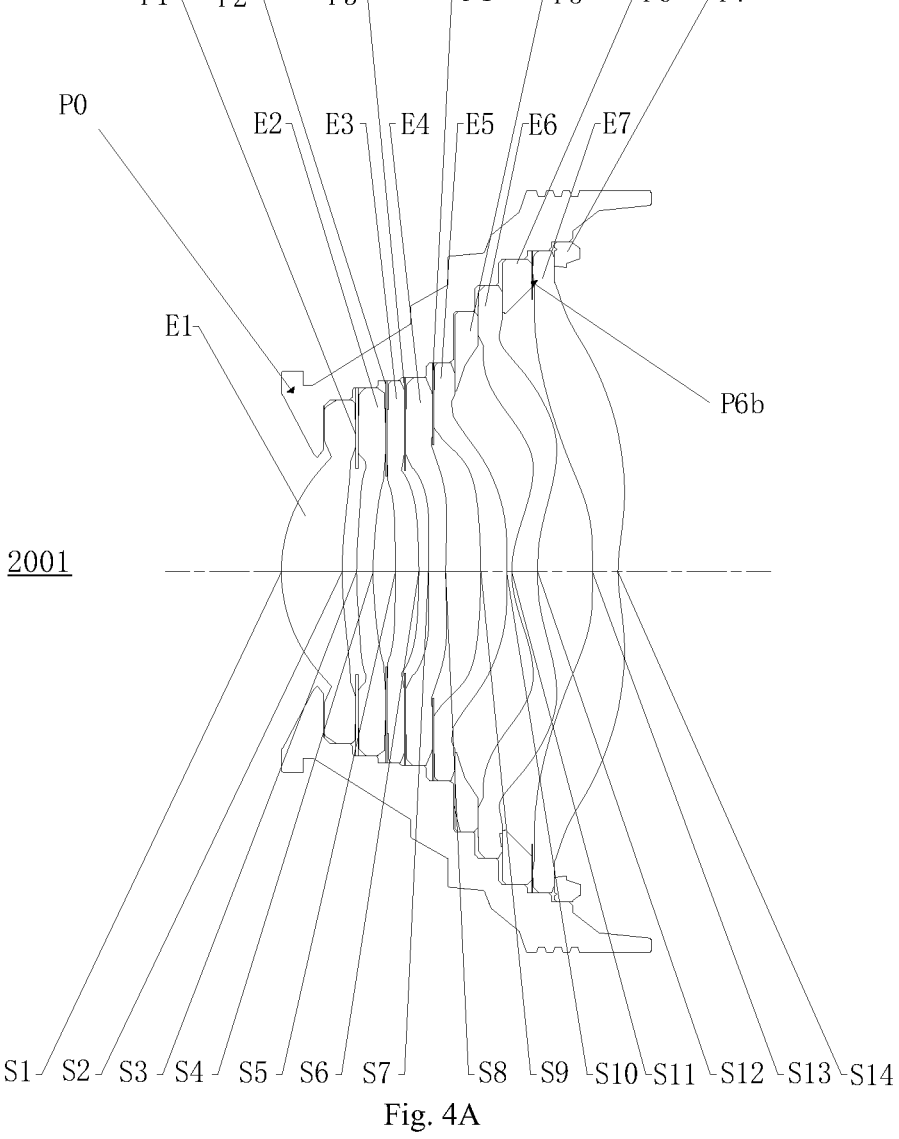
FIGS. 4A-4C illustrate schematic structural diagrams of an optical camera lens assembly according to Embodiment 2 of the present disclosure.
Figure 4B:
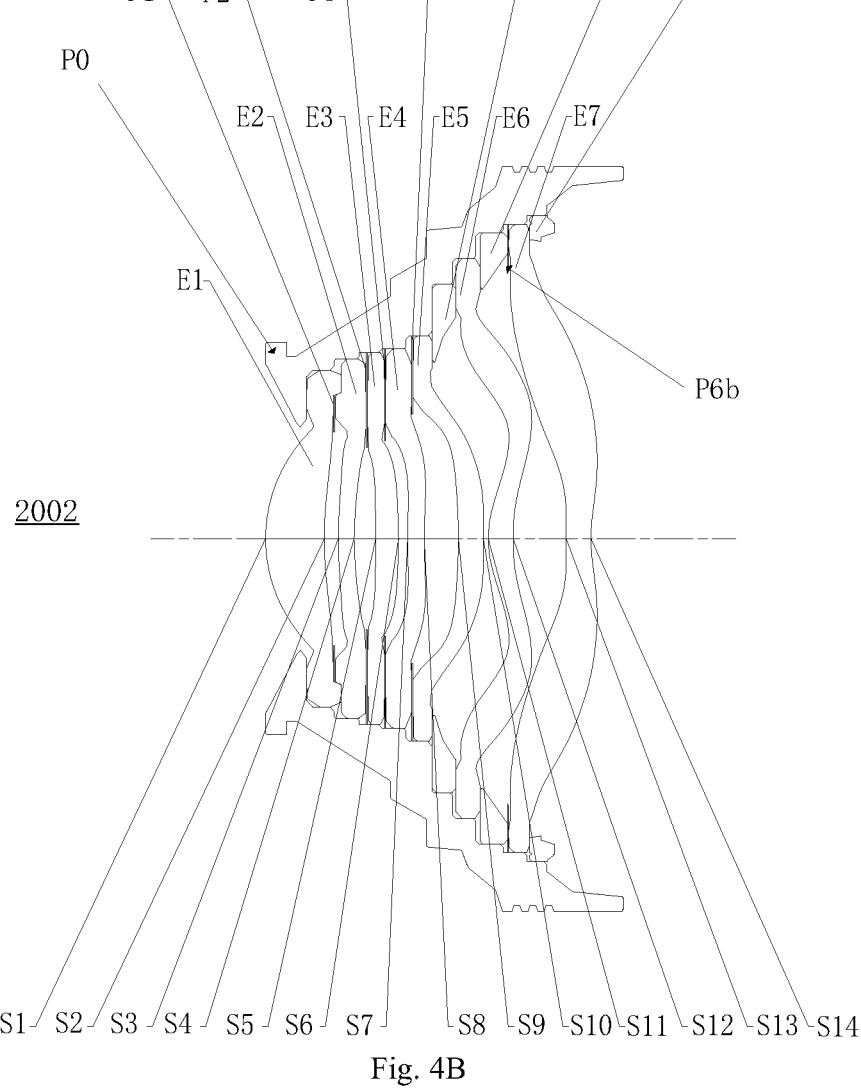
Figure 4C:
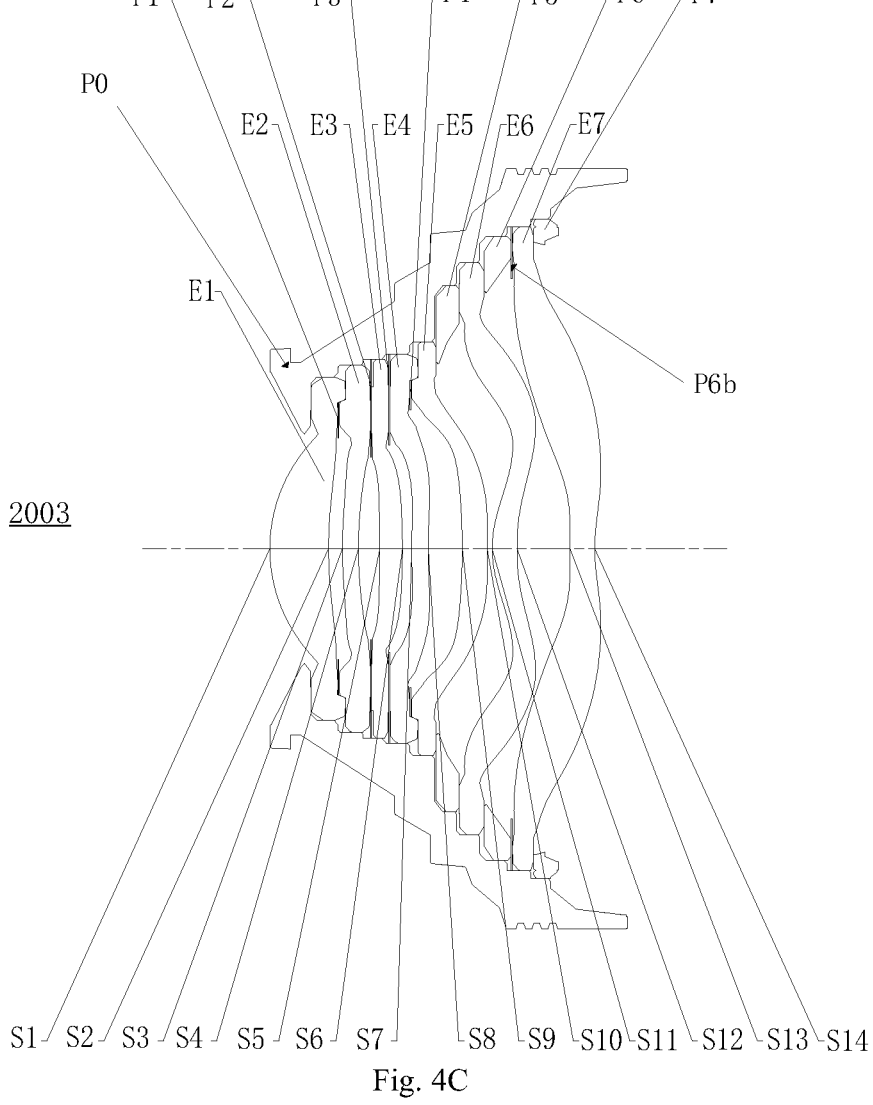

An optical camera lens assembly 2001, an optical camera lens assembly 2002, and an optical camera lens assembly 2003 according to Embodiment 2 of the present disclosure is described below with reference to FIGS. 4A-5C. In this embodiment and the following embodiments, for the sake of brevity, some descriptions similar to those in Embodiment 1 will be omitted. FIGS. 4A-4C respectively illustrate schematic structural diagrams of the optical camera lens assembly 2001, the optical camera lens assembly 2002 and the optical camera lens assembly 2003 according to Embodiment 2 of the present disclosure.

As shown in FIGS. 4A-4C, the optical camera lens assembly 2001, the optical camera lens assembly 2002 and the optical camera lens assembly 2003 each include a lens barrel P0, an imaging lens group including lenses E1 to E7, and a plurality of spacing elements P1 to P7, respectively.

As shown in FIGS. 4A-4C, the optical camera lens assembly 2001, the optical camera lens assembly 2002, and the optical camera lens assembly 2003 use the same imaging lens group, and the imaging lens group from an object side to an image side sequentially includes: a first lens E1, a second lens E2, a third lens E3, a fourth lens E4, a fifth lens E5, a sixth lens E6, and a seventh lens E7 respectively. The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a concave surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. Light from an object sequentially passes through the surfaces S1-S14 and finally forms an image on the image plane (not shown).

In this example, an effective focal length f of each of the optical camera lens assembly 2001, the optical camera lens assembly 2002 and the optical camera lens assembly 2003 is 5.22 mm, half of a maximal field-of-view semi-FOV of each of the optical camera lens assembly 2001, the optical camera lens assembly 2002 and the optical camera lens assembly 2003 is 44.29°, and an F-number Fno of each of the optical camera lens assembly 2001, the optical camera lens assembly 2002 and the optical camera lens assembly 2003 is 1.66.

Table 4 shows a table of basic parameters of the imaging lens group of the optical camera lens assembly 2001, the optical camera lens assembly 2002 and the optical camera lens assembly 2003 in Embodiment 2. Here, the units of a radius of curvature, a thickness/distance and an effective focal length are millimeters (mm). Table 5-1 and table 5-2 show the high-order coefficients applicable to the aspheric surfaces in Embodiment 2. Here, the surface type of each aspheric surface may be defined using the formula (1) given in Embodiment 1.

TABLE 4

| surface number | surface type | radius of curvature | thickness | material refractive index | abbe number | effective focal length | conic coefficient |
|---|---|---|---|---|---|---|---|
| OBJ | spherical | infinite | infinite | | | | |
| STO | spherical | infinite | −0.6681 | | | | |
| S1 | aspheric | 2.0690 | 0.9180 | 1.50 | 81.56 | 6.13 | 0.0000 |
| S2 | aspheric | 5.4715 | 0.2169 | | | | −0.5798 |
| S3 | aspheric | 5.6741 | 0.2500 | 1.67 | 19.25 | −74.92 | −0.2703 |
| S4 | aspheric | 5.0128 | 0.3358 | | | | 0.1810 |
| S5 | aspheric | −20.3759 | 0.3534 | 1.54 | 56.05 | 30.44 | 0.0000 |
| S6 | aspheric | −9.2057 | 0.1442 | | | | 0.0000 |
| S7 | aspheric | 10.4182 | 0.2583 | 1.67 | 19.25 | −34.05 | 0.0000 |
| S8 | aspheric | 7.1054 | 0.5326 | | | | 0.0000 |
| S9 | aspheric | −7.0922 | 0.3885 | 1.57 | 37.31 | −7.61 | −0.2314 |
| S10 | aspheric | 11.3630 | 0.0778 | | | | 0.0000 |
| S11 | aspheric | 1.3998 | 0.3903 | 1.54 | 56.05 | 3.63 | −1.0000 |
| S12 | aspheric | 4.2919 | 0.8264 | | | | −98.9861 |
| S13 | aspheric | 68.9889 | 0.3861 | 1.54 | 55.65 | −4.37 | 0.0000 |
| S14 | aspheric | 2.2643 | 0.4331 | | | | −1.0000 |
| S15 | spherical | infinite | 0.2100 | 1.52 | 64.20 | | |
| S16 | spherical | infinite | 0.4119 | | | | |
| S17 | spherical | infinite | | | | | |

TABLE 5-1

| surface name | A4 | A6 | A8 | A10 | A12 | A14 | A16 |
|---|---|---|---|---|---|---|---|
| S1 | −5.6016E−03 | 2.5386E−02 | −7.9933E−02 | 1.5298E−01 | −1.5513E−01 | 6.5265E−03 | 2.1173E−01 |
| S2 | −1.4029E−02 | −1.5839E−03 | −1.5370E−02 | 1.0622E−01 | −3.6780E−01 | 7.9016E−01 | −1.1301E+00 |
| S3 | −3.6970E−02 | 2.5724E−03 | −5.6727E−02 | 3.6048E−01 | −1.2299E+00 | 2.7431E+00 | −4.1678E+00 |
| S4 | −1.6750E−02 | −6.9557E−02 | 5.4483E−01 | −2.7554E+00 | 9.3175E+00 | −2.1572E+01 | 3.5059E+01 |
| S5 | 1.6798E−02 | −6.8887E−02 | 1.9986E−01 | −7.1024E−01 | 2.1377E+00 | −4.9255E+00 | 8.2136E+00 |
| S6 | 4.0769E−02 | −3.1882E−01 | 1.5343E+00 | −5.4887E+00 | 1.4034E+01 | −2.5809E+01 | 3.4414E+01 |
| S7 | −3.5693E−02 | −2.3036E−01 | 1.0647E+00 | −4.0021E+00 | 1.1379E+01 | −2.3472E+01 | 3.4933E+01 |
| S8 | −4.4543E−02 | −4.6643E−02 | 1.5756E−02 | 1.6335E−01 | −4.2786E−01 | 5.8019E−01 | −5.0664E−01 |
| S9 | 6.7786E−02 | −1.5029E−01 | 2.3455E−01 | −2.7701E−01 | 2.2301E−01 | −1.1257E−01 | 2.6400E−02 |
| S10 | −2.1757E−01 | 4.9500E−02 | 2.1152E−01 | −3.7635E−01 | 3.3949E−01 | −1.8929E−01 | 6.5154E−02 |

TABLE 5-1-continued

| surface name | A4 | A6 | A8 | A10 | A12 | A14 | A16 |
|---|---|---|---|---|---|---|---|
| S11 | −1.4533E−01 | 4.8984E−02 | −3.6437E−02 | 3.3487E−02 | −2.2365E−02 | 9.6455E−03 | −2.7648E−03 |
| S12 | 3.0001E−01 | −4.1925E−01 | 3.4515E−01 | −1.9380E−01 | 7.6708E−02 | −2.1892E−02 | 4.5660E−03 |
| S13 | −1.6450E−01 | 3.9923E−02 | 2.2919E−02 | −1.8705E−02 | 6.3040E−03 | −1.2999E−03 | 1.8111E−04 |
| S14 | −1.8953E−01 | 9.0694E−02 | −3.4765E−02 | 1.2162E−02 | −3.7762E−03 | 9.2149E−04 | −1.6484E−04 |

TABLE 5-2

| surface name | A18 | A20 | A22 | A24 | A26 | A28 | A30 |
|---|---|---|---|---|---|---|---|
| S1 | −3.1809E−01 | 2.5617E−01 | −1.3050E−01 | 4.3216E−02 | −9.0371E−03 | 1.0845E−03 | −5.6875E−05 |
| S2 | 1.1145E+00 | −7.6943E−01 | 3.7133E−01 | −1.2274E−01 | 2.6476E−02 | −3.3559E−03 | 1.8949E−04 |
| S3 | 4.4195E+00 | −3.3045E+00 | 1.7351E+00 | −6.2575E−01 | 1.4751E−01 | −2.0449E−02 | 1.2625E−03 |
| S4 | −4.0533E+01 | 3.3425E+01 | −1.9481E+01 | 7.8268E+00 | −2.0592E+00 | 3.1893E−01 | −2.2021E−02 |
| S5 | −9.7550E+00 | 8.1968E+00 | −4.8150E+00 | 1.9261E+00 | −4.9777E−01 | 7.4548E−02 | −4.8825E−03 |
| S6 | −3.3440E+01 | 2.3627E+01 | −1.1988E+01 | 4.2491E+00 | −9.9736E−01 | 1.3911E−01 | −8.7156E−03 |
| S7 | −3.7608E+01 | 2.9242E+01 | −1.6241E+01 | 6.2780E+00 | −1.6038E+00 | 2.4332E−01 | −1.6599E−02 |
| S8 | 3.0185E−01 | −1.2424E−01 | 3.4848E−02 | −6.3754E−03 | 6.8719E−04 | −3.3138E−05 | 0.0000E+00 |
| S9 | 5.5597E−03 | −6.8823E−03 | 2.6792E−03 | −6.0352E−04 | 8.4296E−05 | −6.9064E−06 | 2.5765E−07 |
| S10 | −1.1569E−02 | −3.9892E−04 | 7.6919E−04 | −1.9844E−04 | 2.6297E−05 | −1.8580E−06 | 5.5550E−08 |
| S11 | 5.4633E−04 | −7.5920E−05 | 7.4300E−06 | −5.0252E−07 | 2.2391E−08 | −5.9199E−10 | 7.0390E−12 |
| S12 | −6.9936E−04 | 7.8390E−05 | −6.3434E−06 | 3.6028E−07 | −1.3612E−08 | 3.0696E−10 | −3.1242E−12 |
| S13 | −1.7701E−05 | 1.2253E−06 | −5.9406E−08 | 1.9490E−09 | −4.0282E−11 | 4.5103E−13 | −1.8247E−15 |
| S14 | 2.1182E−05 | −1.9434E−06 | 1.2605E−07 | −5.6424E−09 | 1.6580E−10 | −2.8779E−12 | 2.2359E−14 |

As shown in FIGS. 4A-4C, the optical camera lens assembly 2001, the optical camera lens assembly 2002 and the optical camera lens assembly 2003 each include eight spacing elements, which are a first spacing element P1, a second spacing element P2, a third spacing element P3, a fourth spacing element P4, a fifth spacing element P5, a sixth spacing element P6, an auxiliary spacing element P6b, and a seventh spacing element P7. Here, the first spacing element P1 is disposed on the image-side surface of the first lens E1; the second spacing element P2 is disposed on the image-side surface of the second lens E2; the third spacing element P3 is disposed on the image-side surface of the third lens E3; the fourth spacing element P4 is disposed on the image-side surface of the fourth lens E4; the fifth spacing element P5 is disposed on the image-side surface of the fifth lens E5; the sixth spacing element P6 is disposed on the image-side surface of the sixth lens E6; the auxiliary spacing element P6b is disposed on the image-side surface of the sixth lens E6 and is in contact with the object-side surface of the seventh lens E7; and the seventh spacing element P7 is disposed on the image-side surface of the seventh lens E7.

In this embodiment, the first spacing element P1, the second spacing element P2, the third spacing element P3, the fourth spacing element P4, and the auxiliary spacing element P6b of the optical camera lens assembly 2001, the optical camera lens assembly 2002 and the optical camera lens assembly 2003 are spacer sheets, the fifth spacing element P5 and the sixth spacing element P6 are spacer rings, and the seventh spacing elements P7 is a compression ring. The above spacing elements may block the entry of excess external light, so that the lenses can be better supported by the lens barrel, enhancing the structural stability of the optical camera lens assembly 2001, the optical camera lens assembly 2002 and the optical camera lens assembly 2003.

Table 6 shows basic parameters of the spacing elements and the lens barrel of the optical camera lens assembly 2001, the optical camera lens assembly 2002 and the optical camera lens assembly 2003 in Embodiment 2. The optical camera lens assembly 2001, the optical camera lens assem-bly 2002 and the optical camera lens assembly 2003 differ in structural dimensions of the spacing elements.

TABLE 6

| embodiment parameter | optical camera lens assembly 1001 | optical camera lens assembly 1002 | optical camera lens assembly 1003 |
|---|---|---|---|
| d1s | 2.933 | 3.113 | 3.167 |
| d2s | 2.719 | 2.653 | 2.605 |
| D2m | 5.241 | 5.418 | 5.410 |
| d6m | 8.102 | 8.298 | 8.282 |
| D6m | 8.777 | 8.777 | 8.789 |
| d0s | 3.249 | 3.249 | 3.271 |
| d0m | 10.470 | 10.470 | 10.492 |
| D0s | 5.653 | 5.653 | 5.631 |
| D0m | 10.804 | 10.804 | 10.831 |
| EP12 | 0.417 | 0.493 | 0.493 |
| CP2 | 0.018 | 0.018 | 0.016 |
| EP23 | 0.264 | 0.264 | 0.266 |
| CP5 | 0.347 | 0.365 | 0.397 |
| D4s | 5.951 | 5.903 | 4.791 |
| EP34 | 0.402 | 0.409 | 0.32 |

Figures 5A, 5B:
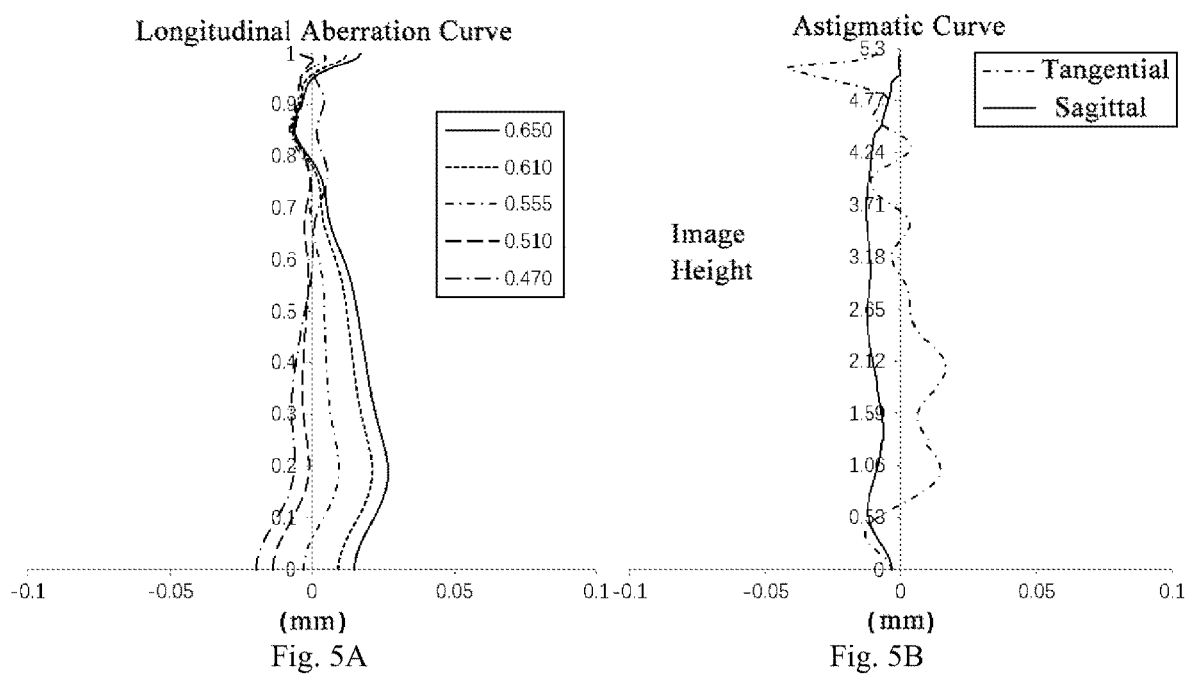
FIGS. 5A-5C respectively illustrate a longitudinal aberration curve, an astigmatic curve, and a lateral color curve of the optical camera lens assembly according to Embodiment 2 of the present disclosure.
Figure 5C:
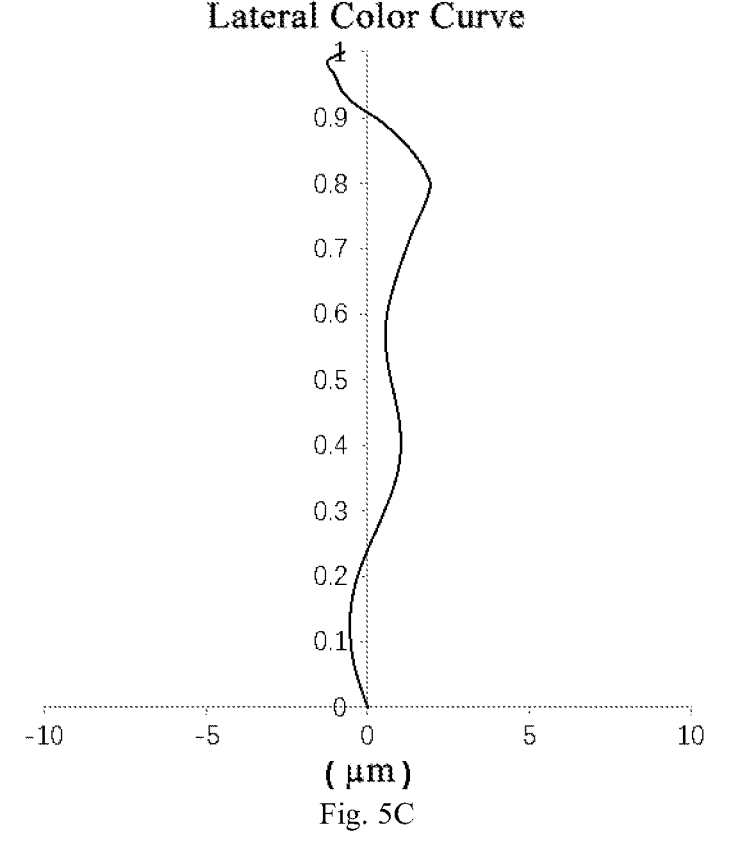

FIG. 5A illustrates a longitudinal aberration curve of the optical camera lens assembly 2001, the optical camera lens assembly 2002 and the optical camera lens assembly 2003 according to Embodiment 2, representing deviations of focal points of light of different wavelengths converged after passing through the lens assembly. FIG. 5B illustrates an astigmatic curve of the optical camera lens assembly 2001, the optical camera lens assembly 2002 and the optical camera lens assembly 2003 according to Embodiment 2, representing a curvature of a tangential image plane and a curvature of a sagittal image plane. FIG. 5C illustrates a lateral color curve of the optical camera lens assembly 2001, the optical camera lens assembly 2002 and the optical camera lens assembly 2003 in Embodiment 2, representing deviations of different image heights on the image plane formed by light passing through the lens assembly. It can be seen from FIGS. 5A-5C that the optical camera lens assem-bly 2001, the optical camera lens assembly 2002 and the optical camera lens assembly 2003 given in Embodiment 2 can achieve a good imaging quality.

Embodiment 3

Figure 6A:
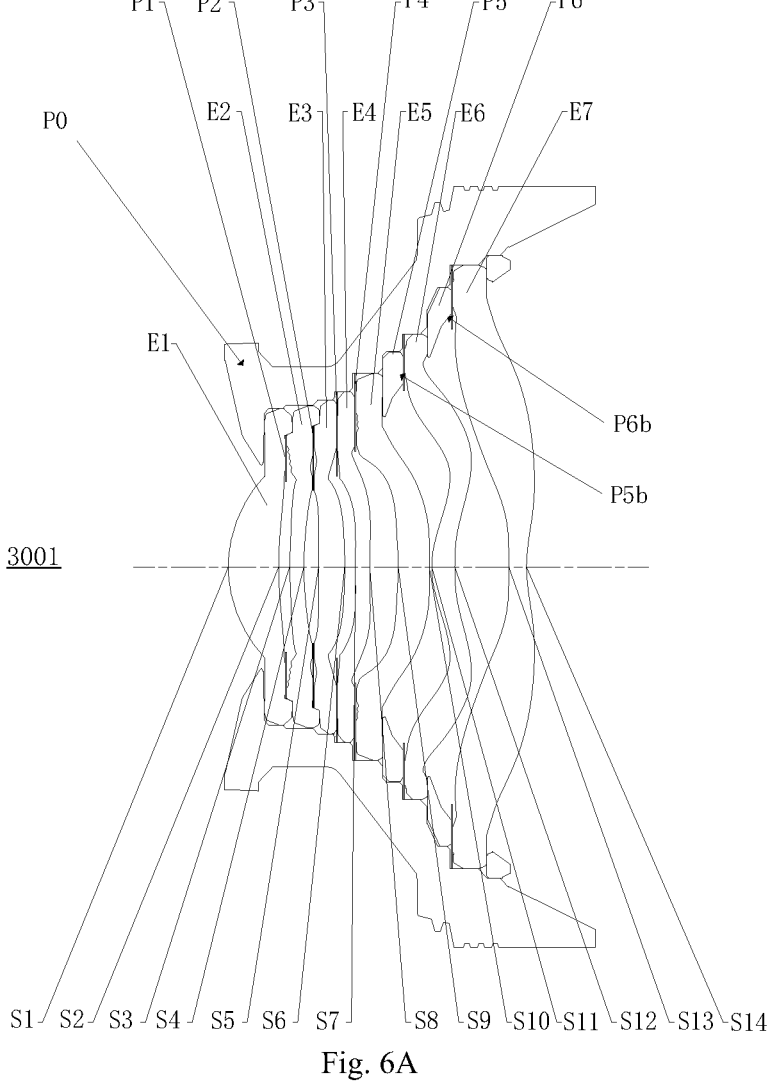
FIGS. 6A-6C illustrate schematic structural diagrams of an optical camera lens assembly according to Embodiment 3 of the present disclosure.
Figure 6B:
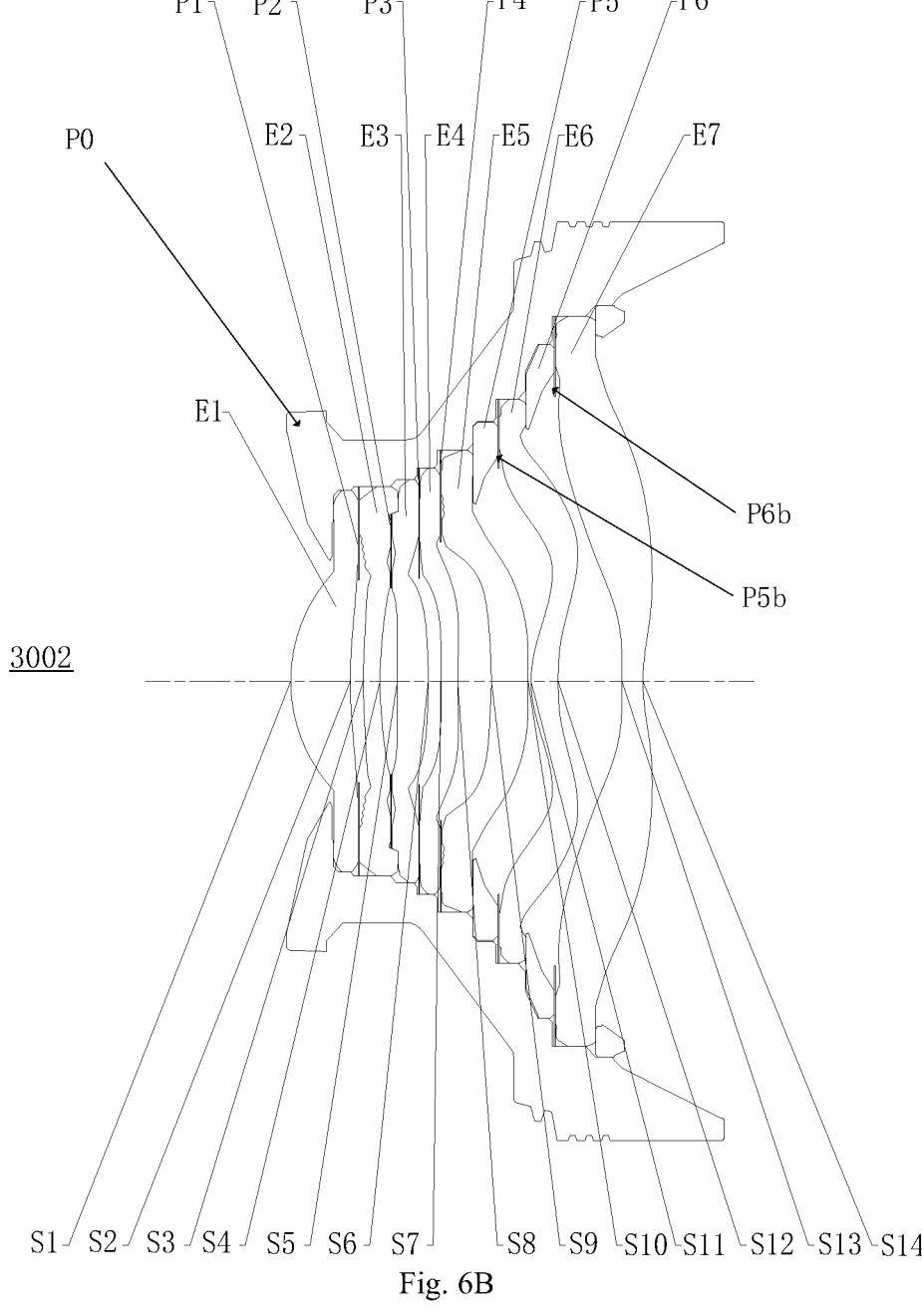
Figure 6C:
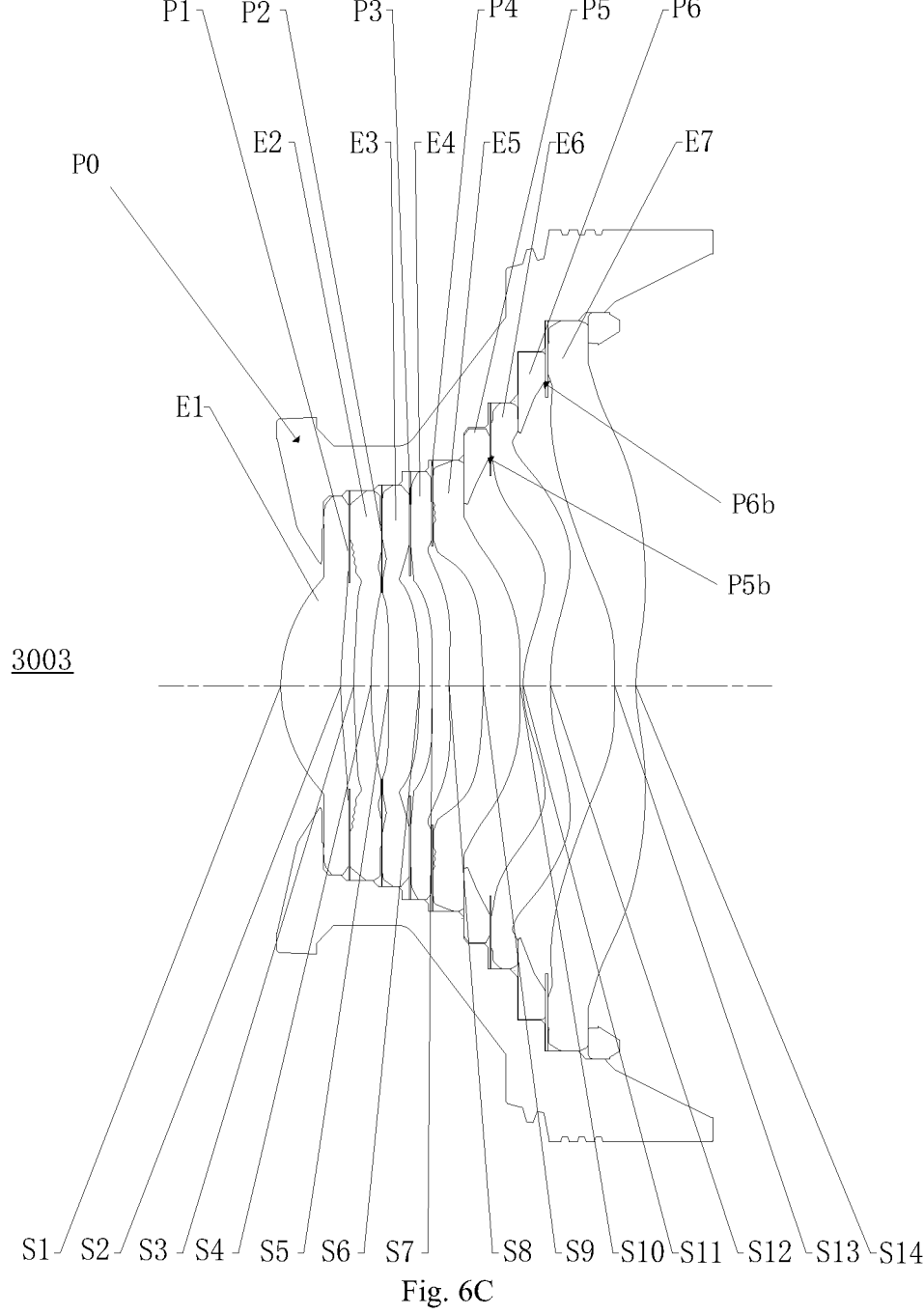

An optical camera lens assembly 3001, an optical camera lens assembly 3002 and an optical camera lens assembly 3003 according to Embodiment 3 of the present disclosure is described below with reference to FIGS. 6A-7C. FIGS. 6A-6C respectively illustrate schematic structural diagrams of the optical camera lens assembly 3001, the optical camera lens assembly 3002 and the optical camera lens assembly 3003 according to Embodiment 3 of the present disclosure.

As shown in FIGS. 6A-6C, the optical camera lens assembly 3001, the optical camera lens assembly 3002 and the optical camera lens assembly 3003 each include a lens barrel P0, an imaging lens group including lenses E1 to E7, and a plurality of spacing elements P1 to P7, respectively.

As shown in FIGS. 6A-6C, the optical camera lens assembly 3001, the optical camera lens assembly 3002 and the optical camera lens assembly 3003 use the same imaging lens group, and the imaging lens group from an object side to an image side sequentially includes: a first lens E1, a second lens E2, a third lens E3, a fourth lens E4, a fifth lens E5, a sixth lens E6, and a seventh lens E7 respectively. The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a concave surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a concave surface, and an image-side surface S14 of the seventh lens E7 is a concave surface. Light from an object sequentially passes through the surfaces S1-S14 and finally forms an image on the image plane (not shown).

In this example, an effective focal length f of each of the optical camera lens assembly 3001, the optical camera lens assembly 3002 and the optical camera lens assembly 3003 is 4.89 mm, half of a maximal field-of-view semi-FOV of each of the optical camera lens assembly 3001, the optical camera lens assembly 3002 and the optical camera lens assembly 3003 is 44.3°, and an F-number Fno of each of the optical camera lens assembly 3001, the optical camera lens assembly 3002 and the optical camera lens assembly 3003 is 1.66.

Table 7 shows a table of basic parameters of the imaging lens group of the optical camera lens assembly 3001, the optical camera lens assembly 3002 and the optical camera lens assembly 3003 in Embodiment 3. Here, the units of a radius of curvature, a thickness/distance and an effective focal length are millimeters (mm). Table 8-1 and table 8-2 show the high-order coefficients applicable to the aspheric surfaces in Embodiment 3. Here, the surface type of each aspheric surface may be defined using the formula (1) given in Embodiment 1.

TABLE 7

| surface number | surface type | radius of curvature | thickness | material refractive index | material abbe number | effective length focal | conic coefficient |
|---|---|---|---|---|---|---|---|
| OBJ | spherical | infinite | infinite | | | | |
| STO | spherical | infinite | −0.5925 | | | | |
| S1 | aspheric | 2.0808 | 0.8940 | 1.50 | 81.56 | 5.84 | 0.0093 |
| S2 | aspheric | 6.2602 | 0.1931 | | | | −0.3701 |
| S3 | aspheric | 6.3988 | 0.2519 | 1.67 | 19.25 | −37.01 | 0.5829 |
| S4 | aspheric | 5.0168 | 0.2628 | | | | −0.3670 |
| S5 | aspheric | 500.0000 | 0.4612 | 1.54 | 56.05 | 16.53 | 0.0000 |
| S6 | aspheric | −9.1806 | 0.1894 | | | | 0.0000 |
| S7 | aspheric | 25.2848 | 0.2539 | 1.67 | 19.25 | −27.15 | 0.0000 |
| S8 | aspheric | 10.6065 | 0.5043 | | | | 0.0000 |
| S9 | aspheric | −6.7351 | 0.5510 | 1.57 | 37.31 | −7.31 | 6.7032 |
| S10 | aspheric | 11.2243 | 0.0455 | | | | 0.0000 |
| S11 | aspheric | 1.4919 | 0.4079 | 1.54 | 56.05 | 3.66 | −1.0000 |
| S12 | aspheric | 5.3152 | 0.9542 | | | | −81.0124 |
| S13 | aspheric | −392.3672 | 0.3156 | 1.54 | 55.65 | −4.22 | 0.0000 |
| S14 | aspheric | 2.2764 | 0.3039 | | | | −1.0000 |
| S15 | spherical | infinite | 0.2100 | 1.52 | 64.20 | | |
| S16 | spherical | infinite | 0.2824 | | | | |
| S17 | spherical | infinite | | | | | |

TABLE 8-1

| surface name | A4 | A6 | A8 | A10 | A12 | A14 | A16 |
|---|---|---|---|---|---|---|---|
| S1 | −4.0336E−03 | 3.7352E−02 | −2.0137E−01 | 6.7647E−01 | −1.4992E+00 | 2.2770E+00 | −2.4261E+00 |
| S2 | −1.3089E−02 | −3.7106E−02 | 2.4404E−01 | −9.7902E−01 | 2.5773E+00 | −4.6541E+00 | 5.9325E+00 |
| S3 | −4.4854E−02 | 3.7536E−02 | −2.9341E−01 | 1.4960E+00 | −4.8550E+00 | 1.0784E+01 | −1.6859E+01 |

TABLE 8-1-continued

| surface name | A4 | A6 | A8 | A10 | A12 | A14 | A16 |
|---|---|---|---|---|---|---|---|
| S4 | −1.8007E−02 | −1.2054E−01 | 1.1579E+00 | −6.6774E+00 | 2.5253E+01 | −6.5255E+01 | 1.1863E+02 |
| S5 | 2.0556E−03 | −1.0904E−02 | −5.5680E−02 | 2.3120E−01 | −4.4765E−01 | 7.5897E−02 | 1.6426E+00 |
| S6 | 2.3778E−02 | −2.733 IE−01 | 1.4418E+00 | −5.2947E+00 | 1.3503E+01 | −2.4568E+01 | 3.2383E+01 |
| S7 | −4.7544E−02 | −6.6518E−02 | 7.4301E−02 | 2.0797E−01 | −9.9669E−01 | 1.9079E+00 | −2.0559E+00 |
| S8 | −3.8597E−02 | −5.9819E−02 | 1.3013E−01 | −2.0169E−01 | 2.3443E−01 | −2.0501E−01 | 1.3326E−01 |
| S9 | 4.9116E−02 | −7.2803E−02 | 3.5351E−02 | 1.2307E−01 | −3.9054E−01 | 5.8990E−01 | −5.7085E−01 |
| S10 | −2.3279E−01 | 1.1038E−01 | 1.4509E−01 | −3.8666E−01 | 4.5610E−01 | −3.4992E−01 | 1.8905E−01 |
| S11 | −1.4970E−01 | 9.1208E−02 | −7.9189E−02 | 5.3940E−02 | −2.6329E−02 | 8.8937E−03 | −2.0817E−03 |
| S12 | 2.5133E−01 | −3.0601E−01 | 2.2186E−01 | −1.1240E−01 | 4.0850E−02 | −1.0833E−02 | 2.1171E−03 |
| S13 | −1.2807E−01 | 3.0841E−02 | 7.2687E−03 | −5.2344E−03 | 1.0993E−03 | −7.7169E−05 | −1.0879E−05 |
| S14 | −1.401 IE−01 | 5.4521E−02 | −1.7550E−02 | 5.4142E−03 | −1.5103E−03 | 3.2938E−04 | −5.2303E−05 |

TABLE 8-2

| surface name | A18 | A20 | A22 | A24 | A26 | A28 | A30 |
|---|---|---|---|---|---|---|---|
| S1 | 1.8333E+00 | −9.8120E−01 | 3.6637E−01 | −9.2200E−02 | 1.4621E−02 | −1.2738E−03 | 4.2924E−05 |
| S2 | −5.4219E+00 | 3.5668E+00 | −1.6750E+00 | 5.4792E−01 | −1.1866E−01 | 1.5298E−02 | −8.8916E−04 |
| S3 | 1.8814E+01 | −1.5035E+01 | 8.5272E+00 | −3.3468E+00 | 8.6324E−01 | −1.3147E−01 | 8.9458E−03 |
| S4 | −1.5413E+02 | 1.4369E+02 | −9.5314E+01 | 4.3888E+01 | −1.3329E+01 | 2.4003E+00 | −1.9407E−01 |
| S5 | −4.1951E+00 | 5.6144E+00 | −4.7220E+00 | 2.5765E+00 | −8.8757E−01 | 1.7562E−01 | −1.5209E−02 |
| S6 | −3.1143E+01 | 2.1813E+01 | −1.0988E+01 | 3.8719E+00 | −9.0451E−01 | 1.2569E−01 | −7.8527E−03 |
| S7 | 1.1733E+00 | −7.8485E−02 | −4.0596E−02 | 3.2197E−01 | −1.2205E−01 | 2.4216E−02 | −2.0203E−03 |
| S8 | −6.3186E−02 | 2.1318E−02 | −4.8981E−03 | 7.0809E−04 | −5.5241E−05 | 1.5781E−06 | 0.0000E+00 |
| S9 | 3.8073E−01 | −1.7918E−01 | 5.9463E−02 | −1.3616E−02 | 2.0461E−03 | −1.8136E−04 | 7.1767E−06 |
| S10 | −7.3785E−02 | 2.0881E−02 | −4.2369E−03 | 5.9949E−04 | −5.6063E−05 | 3.1100E−06 | −7.7411E−08 |
| S11 | 3.4172E−04 | −3.9576E−05 | 3.2106E−06 | −1.7777E−07 | 6.3508E−09 | −1.3020E−10 | 1.1347E−12 |
| S12 | −3.0572E−04 | 3.2473E−05 | −2.5023E−06 | 1.3604E−07 | −4.9483E−09 | 1.0813E−10 | −1.0741E−12 |
| S13 | 3.2857E−06 | −3.9552E−07 | 2.8661E−08 | −1.3372E−09 | 3.9554E−11 | −6.7856E−13 | 5.1613E−15 |
| S14 | 5.9420E−06 | −4.8093E−07 | 2.7479E−08 | −1.0827E−09 | 2.7989E−11 | −4.2732E−13 | 2.9207E−15 |

As shown in FIGS. 6A-6C, the optical camera lens assembly 3001, the optical camera lens assembly 3002 and the optical camera lens assembly 3003 each include nine spacing elements, which are a first spacing element P1, a second spacing element P2, a third spacing element P3, a fourth spacing element P4, a fifth spacing element P5, an auxiliary spacing element P5b, a sixth spacing element P6, an auxiliary spacing element P6b, and a seventh spacing element P7. Here, the first spacing element P1 is disposed on the image-side surface of the first lens E1; the second spacing element P2 is disposed on the image-side surface of the second lens E2; the third spacing element P3 is disposed on the image-side surface of the third lens E3; the fourth spacing element P4 is disposed on the image-side surface of the fourth lens E4; the fifth spacing element P5 is disposed on the image-side surface of the fifth lens E5; the auxiliary spacing element P5b is disposed on the image-side surface of the fifth lens E5 and is in contact with the object-side surface of the sixth lens E6; the sixth spacing element P6 is disposed on the image-side surface of the sixth lens E6; the auxiliary spacing element P6b is disposed on the image-side surface of the sixth lens E6 and is in contact with the object-side surface of the seventh lens E7; and the seventh spacing element P7 is disposed on the image-side surface of the seventh lens E7.

In this embodiment, the first spacing element P1, the second spacing element P2, the third spacing element P3, the fourth spacing element P4, the auxiliary spacing element P5b and the auxiliary spacing element P6b of the optical camera lens assembly 3001, the optical camera lens assembly 3002 and the optical camera lens assembly 3003 are spacer sheets, the fifth spacing element P5 and the sixth spacing element P6 are spacer rings, and the seventh spacing element P7 is a compression ring. The above spacing elements may block the entry of excess external light, so that the lenses can be better supported by the lens barrel, and enhancing the structural stability of the optical camera lens assembly 3001, the optical camera lens assembly 3002 and the optical camera lens assembly 3003.

Table 9 shows basic parameters of the spacing elements and the lens barrel of the optical camera lens assembly 3001, the optical camera lens assembly 3002 and the optical camera lens assembly 3003 in Embodiment 3. The optical camera lens assembly 3001, the optical camera lens assembly 3002 and the optical camera lens assembly 3003 differ in structural dimensions of the spacing elements.

TABLE 9

| embodiment parameter | optical camera lens assembly 1001 | optical camera lens assembly 1002 | optical camera lens assembly 1003 |
|---|---|---|---|
| d1s | 2.854 | 2.807 | 2.884 |
| d2s | 2.552 | 2.574 | 2.610 |
| D2m | 4.706 | 4.624 | 5.607 |
| d6m | 8.467 | 8.575 | 8.531 |
| D6m | 9.255 | 9.214 | 9.244 |
| d0s | 3.387 | 3.343 | 3.403 |
| d0m | 12.121 | 12.151 | 12.067 |
| D0s | 7.449 | 7.353 | 7.353 |
| D0m | 12.731 | 12.691 | 12.711 |
| EP12 | 0.468 | 0.464 | 0.464 |
| CP2 | 0.012 | 0.016 | 0.016 |
| EP23 | 0.411 | 0.407 | 0.407 |
| CP5 | 0.363 | 0.365 | 0.380 |
| D4s | 6.467 | 6.391 | 6.291 |
| EP34 | 0.305 | 0.309 | 0.309 |

Figure 7A:
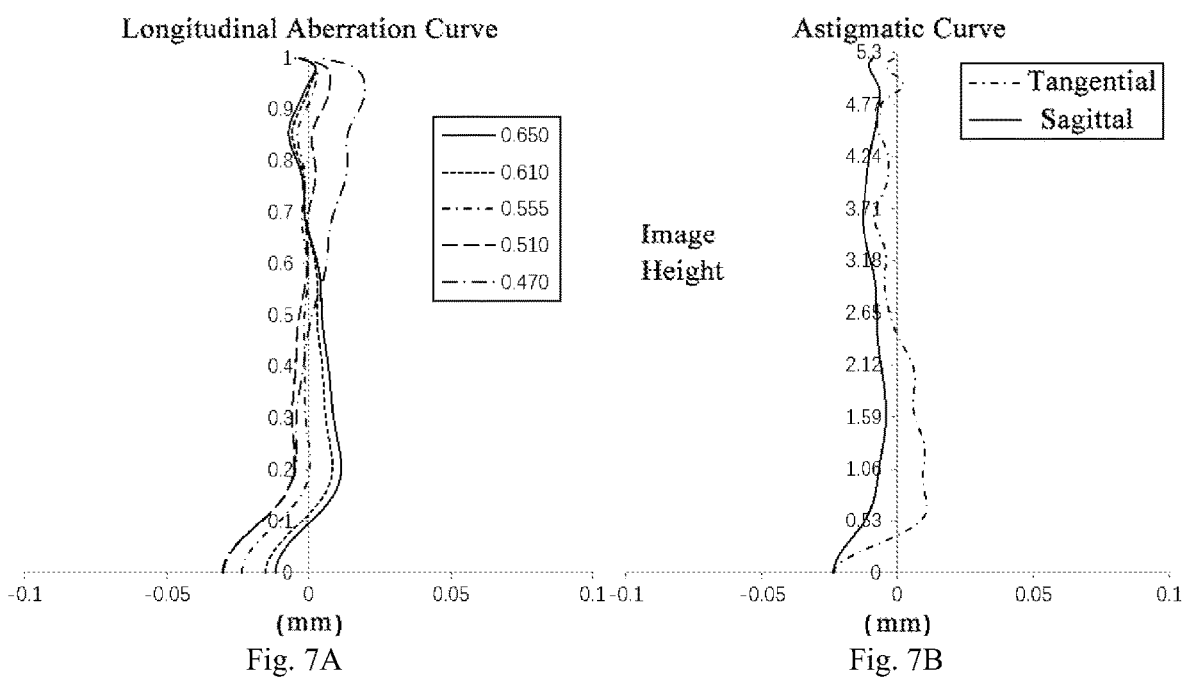
FIGS. 7A-7C respectively illustrate a longitudinal aberration curve, an astigmatic curve, and a lateral color curve of the optical camera lens assembly according to Embodiment 3 of the present disclosure.
Figure 7B:
Figure 7C:
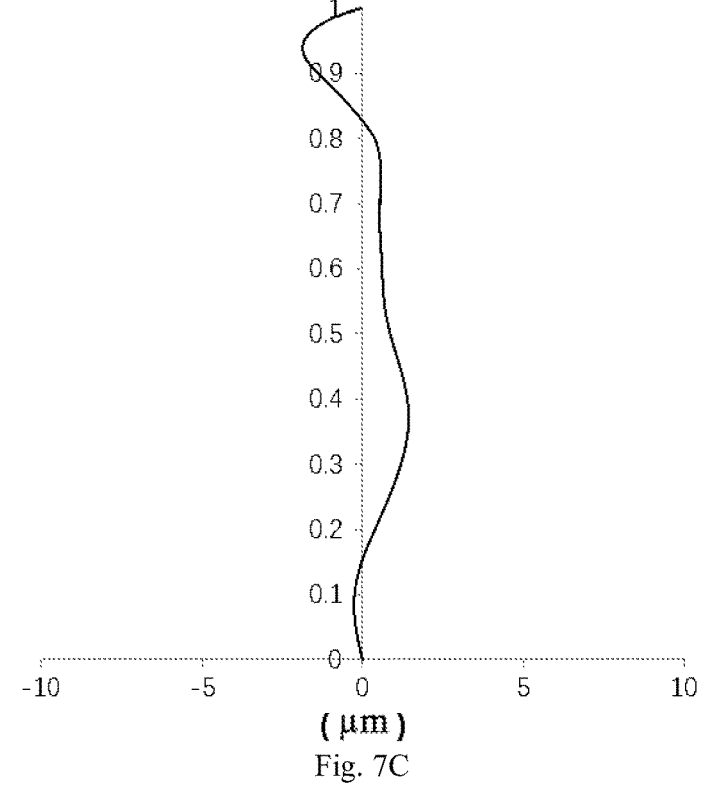

FIG. 7A illustrates a longitudinal aberration curve of the optical camera lens assembly 3001, the optical camera lens assembly 3002 and the optical camera lens assembly 3003 according to Embodiment 3, representing deviations of focal points of light of different wavelengths converged after passing through the lens assembly. FIG. 7B illustrates an astigmatic curve of the optical camera lens assembly 3001, the optical camera lens assembly 3002 and the optical camera lens assembly 3003 according to Embodiment 3, representing a curvature of a tangential image plane and a curvature of a sagittal image plane. FIG. 7C illustrates a lateral color curve of the optical camera lens assembly 3001, the optical camera lens assembly 3002 and the optical camera lens assembly 3003 in Embodiment 3, representing deviations of different image heights on the image plane formed by light passing through the lens assembly. It can be seen from FIGS. 7A-7C that the optical camera lens assembly 3001, the optical camera lens assembly 3002 and the optical camera lens assembly 3003 given in Embodiment 3 can achieve a good imaging quality.

In summary, the optical camera lens assemblies 1001, 1002, 1003, 2001, 2002, 2003, 3001, 3002, and 3003 in Embodiment 1 to Embodiment 3 satisfy the relationships shown in Table 10.

a plurality of spacing elements, comprising a first spacing element disposed on an image-side surface of the first lens and a second spacing element disposed on an image-side surface of the second lens; and a lens barrel, for accommodating the imaging lens group and the plurality of spacing elements;

wherein, a radius of curvature R1 of an object-side surface of the first lens, a radius of curvature R2 of the image-side surface of the first lens, and a radius of curvature R3 of an object-side surface of the second lens satisfy: R2/R3>R1/R2>0; and an inner diameter d1s of an object-side surface of the first spacing element, a center thickness CT1 of the first lens on the optical axis, an outer diameter D2m of an image-side surface of the second spacing element, and an air spacing T23 on the optical axis between the second lens and the third lens satisfy: 9<d1s/CT1+D2m/T23<26, wherein the plurality of spacing elements further comprise a third spacing element disposed on an image-side surface of the third lens, a fourth spacing element disposed on an image-side surface of the fourth lens,

TABLE 10

| conditional expression/optical camera lens assembly | 1001 | 1002 | 1003 | 2001 | 2002 | 2003 | 3001 | 3002 | 3003 |
|---|---|---|---|---|---|---|---|---|---|
| d1s/CT1 + D2m/T23 | 19.22 | 19.07 | 19.15 | 18.80 | 19.53 | 19.56 | 21.10 | 20.73 | 24.56 |
| D0s/(CT1 + T12 + T23) + D0m/T67 | 15.56 | 15.56 | 15.64 | 16.92 | 16.92 | 16.94 | 18.86 | 18.75 | 18.77 |
| (EP12 + CP2 + EP23)/T34 | 4.31 | 4.30 | 4.31 | 4.85 | 5.37 | 5.37 | 4.70 | 4.68 | 4.68 |
| f1/d2s + D2m/T23 | 18.72 | 18.66 | 18.80 | 17.86 | 18.45 | 18.46 | 20.20 | 19.86 | 23.57 |
| d0s/(T12 + CT2) + D0s/CT6 | 25.77 | 26.01 | 26.06 | 21.44 | 21.44 | 21.43 | 25.87 | 25.54 | 25.67 |
| (d0m − d0s)/(T34 + CT4) | 13.38 | 13.23 | 13.21 | 17.94 | 17.94 | 17.94 | 19.70 | 19.87 | 19.54 |
| \|R6/T23\| + D4s/CT4 | 41.65 | 41.65 | 45.87 | 50.45 | 50.27 | 45.96 | 60.40 | 60.11 | 59.71 |
| EP34/T34 + CP5/T56 | 9.32 | 9.32 | 9.42 | 7.25 | 7.53 | 7.32 | 9.59 | 9.65 | 9.98 |
| d6m/R11 + D6m/CT5 | 22.72 | 22.62 | 22.62 | 28.38 | 28.52 | 28.54 | 22.47 | 22.47 | 22.49 |

The present disclosure further provides an imaging apparatus having an electronic photosensitive element which may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical camera lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in the present disclosure with (but not limited to) technical features with similar functions.

What is claimed is:

1. An optical camera lens assembly, comprising:
an imaging lens group, along an optical axis from an object side to an image side sequentially comprising: a first lens, a second lens, a third lens, a fourth lens, a fifth lens, a sixth lens, and a seventh lens, wherein at least one of the first lens to the fourth lens has a negative refractive power;

and a fifth spacing element disposed on an image-side surface of the fifth lens, wherein, a spacing distance EP34 between the third spacing element and the fourth spacing element along the optical axis, an air spacing T34 on the optical axis between the third lens and the fourth lens, a maximal thickness CP5 of the fifth spacing element along the optical axis, and an air spacing T56 between the fifth lens and the sixth lens on the optical axis satisfy: 7<EP34/T34+CP5/T56<10.5.

2. The optical camera lens assembly according to claim 1, wherein an outer diameter D0s of an object-side end surface of the lens barrel facing the object side, the center thickness CT1 of the first lens on the optical axis, an air spacing T12 on the optical axis between the first lens and the second lens, the air spacing T23 on the optical axis between the second lens and the third lens, an outer diameter D0m of an image-side end surface of the lens barrel facing the image side, and an air spacing T67 on the optical axis between the sixth lens and the seventh lens satisfy: 13<D0s/(CT1+T12+T23)+D0m/T67<20.

3. The optical camera lens assembly according to claim 1, wherein a spacing distance EP12 between the first spacing element and the second spacing element along the optical axis, the spacing distance EP23 between the second spacing element and the third spacing element along the optical axis, a maximal thickness CP2 of the second spacing element along the optical axis, and an air spacing T34 on the optical axis between the third lens and the fourth lens satisfy: 4<(EP12+CP2+EP23)/T34<6.

4. The optical camera lens assembly according to claim 1, wherein an effective focal length f1 of the first lens, an inner diameter d2s of an object-side surface of the second spacing element, an outer diameter D2m of the image-side surface of the second spacing element, and the air spacing T23 on the optical axis between the second lens and the third lens satisfy: 7<f1/d2s+D2m/T23<25.

5. The optical camera lens assembly according to claim 1, wherein an inner diameter d0s of an object-side end surface of the lens barrel facing the object side, an outer diameter D0s of the object-side end surface of the lens barrel facing the object side, an air spacing T12 on the optical axis between the first lens and the second lens, a center thickness CT2 of the second lens on the optical axis, and a center thickness CT6 of the sixth lens on the optical axis satisfy: 21<d0s/(T12+CT2)+D0s/CT6<27.

6. The optical camera lens assembly according to claim 1, wherein an inner diameter d0m of an image-side end surface of the lens barrel facing the image side, an inner diameter d0s of an object-side end surface of the lens barrel facing the object side, the air spacing T34 on the optical axis between the third lens and the fourth lens, and a center thickness CT4 of the fourth lens on the optical axis satisfy: 12<(d0m−d0s)/(T34+CT4)<21.

7. The optical camera lens assembly according to claim 4, wherein,
a radius of curvature R6 of the image-side surface of the third lens, the air spacing T23 on the optical axis between the second lens and the third lens, an outer diameter D4s of an object-side surface of the fourth spacing element, and a center thickness CT4 of the fourth lens on the optical axis satisfy: 28<|R6/T23|+D4s/CT4<62.

8. The optical camera lens assembly according to claim 1, wherein the plurality of spacing elements further comprise a sixth spacing element disposed on an image-side surface of the sixth lens, wherein, an inner diameter d6m of an image-side surface of the sixth spacing element, an outer diameter D6m of the image-side surface of the sixth spacing element, a radius of curvature R11 of an object-side surface of the sixth lens, and a center thickness CT5 of the fifth lens on the optical axis satisfy: 20<d6m/R11+D6m/CT5<30.

9. The optical camera lens assembly according to claim 1, wherein
the object-side surface of the first lens is a convex surface, and the image-side surface of the first lens is a concave surface; and the third lens has a positive refractive power, and the image-side surface of the third lens is a convex surface;
the sixth lens has a positive refractive power, the object-side surface of the sixth lens is a convex surface, and the image-side surface of the sixth lens is a concave surface; or
the fifth lens has a negative refractive power, and both an object-side surface of the fifth lens and the image-side surface of the fifth lens are concave surfaces.

10. The optical camera lens assembly according to claim 1, wherein
a combined focal length of the first lens, the second lens and the third lens is a positive value.

11. The optical camera lens assembly according to claim 9, wherein the sixth lens has a positive refractive power, an object-side surface of the sixth lens is a convex surface, and an image-side surface of the sixth lens is a concave surface.

12. The optical camera lens assembly according to claim 11, wherein the fifth lens has a negative refractive power, and both an object-side surface of the fifth lens and the image-side surface of the fifth lens are concave surfaces.

* * * * *